(12) United States Patent
Leventis et al.

(10) Patent No.: US 11,135,564 B2
(45) Date of Patent: Oct. 5, 2021

(54) POROUS POLYMER COMPOSITIONS FOR THE SYNTHESIS OF MONOLITHIC BIMODAL MICROPOROUS/MACROPOROUS CARBON COMPOSITIONS USEFUL FOR SELECTIVE CO2 SEQUESTRATION

(71) Applicant: Aspen Aerogels, Inc., Northborough, MA (US)

(72) Inventors: Nicholas Leventis, Worcester, MA (US); Chariklia Sotiriou-Leventis, Rolla, MO (US); Malik Adnan Saeed, Rolla, MO (US)

(73) Assignee: Aspen Aerogels, Inc., Northborough, MA (US)

( * ) Notice: Subject to any disclaimer, the term of this patent is extended or adjusted under 35 U.S.C. 154(b) by 808 days.

(21) Appl. No.: 15/466,968

(22) Filed: Mar. 23, 2017

(65) Prior Publication Data
US 2018/0272312 A1    Sep. 27, 2018

(51) Int. Cl.
| | |
|---|---|
| *B01D 53/02* | (2006.01) |
| *B01J 20/20* | (2006.01) |
| *C08G 18/76* | (2006.01) |
| *C08J 9/28* | (2006.01) |
| *B01J 13/00* | (2006.01) |
| *B01J 20/28* | (2006.01) |
| *B01J 20/30* | (2006.01) |
| *C10L 3/10* | (2006.01) |
| *C01B 32/00* | (2017.01) |
| *C08G 18/34* | (2006.01) |
| *C08J 9/36* | (2006.01) |

(52) U.S. Cl.
CPC ............. *B01J 20/20* (2013.01); *B01D 53/02* (2013.01); *B01J 13/0065* (2013.01); *B01J 13/0091* (2013.01); *B01J 20/28042* (2013.01); *B01J 20/28047* (2013.01); *B01J 20/3078* (2013.01); *B01J 20/3085* (2013.01); *C01B 32/00* (2017.08); *C08G 18/346* (2013.01); *C08G 18/7664* (2013.01); *C08J 9/286* (2013.01); *C10L 3/104* (2013.01); *B01D 2253/102* (2013.01); *B01D 2257/504* (2013.01); *C08G 2110/0091* (2021.01); *C08J 9/36* (2013.01); *C08J 2201/0543* (2013.01); *C08J 2205/026* (2013.01); *C08J 2205/044* (2013.01); *C08J 2205/048* (2013.01); *C08J 2205/05* (2013.01); *C08J 2375/02* (2013.01); *C08J 2375/04* (2013.01); *C08J 2377/00* (2013.01); *C08J 2379/08* (2013.01); *C10L 2290/542* (2013.01); *Y02C 20/20* (2013.01); *Y02C 20/40* (2020.08)

(58) Field of Classification Search
CPC ........ B01D 2253/102; B01D 2257/504; B01D 53/02; B01J 20/20; B01J 20/28042; B01J 20/28047; B01J 20/3078; B01J 20/3085; Y02C 10/08; Y02C 20/20
See application file for complete search history.

(56) References Cited

U.S. PATENT DOCUMENTS

| | | | | |
|---|---|---|---|---|
| 2013/0338247 A1* | 12/2013 | Leventis | ................... | E04B 1/88 521/97 |
| 2014/0045070 A1* | 2/2014 | Mueller-Cristadoro | ..................... | H01M 2/145 429/223 |
| 2014/0171526 A1* | 6/2014 | Cristadoro | ............... | C08J 9/286 521/113 |
| 2015/0111976 A1* | 4/2015 | Leventis | .............. | B01J 13/0091 521/64 |
| 2016/0102187 A1* | 4/2016 | Leventis | .............. | B01J 13/0091 521/153 |
| 2016/0229972 A1* | 8/2016 | Frisch, Jr. | .................. | C08J 9/08 |

* cited by examiner

*Primary Examiner* — Christopher P Jones
(74) *Attorney, Agent, or Firm* — Christopher Stow; Poongunran Muthukumaran

(57) ABSTRACT

The present invention discloses novel porous polymeric compositions comprising random copolymers of amides, imides, ureas, and carbamic-anhydrides, useful for the synthesis of monolithic bimodal microporous/macroporous carbon aerogels. It also discloses methods for producing said microporous/macroporous carbon aerogels by the reaction of a polyisocyanate compound and a polycarboxylic acid compound, followed by pyrolytic carbonization, and by reactive etching with $CO_2$ at elevated temperatures. Also disclosed are methods for using the microporous/macroporous carbon aerogels in the selective capture and sequestration of carbon dioxide.

10 Claims, 20 Drawing Sheets

POROUS POLYMER COMPOSITIONS FOR THE SYNTHESIS OF MONOLITHIC BIMODAL MICROPOROUS/MACROPOROUS CARBON COMPOSITIONS USEFUL FOR SELECTIVE CO2 SEQUESTRATION

GOVERNMENT RIGHTS

This invention was made with Government support under Grant No. W911NF-14-1-0369 awarded by the Army Research Office. The U.S. government has certain rights in the invention.

TECHNICAL FIELD

The present invention relates to novel compositions comprising monolithic bimodal microporous/macroporous carbon gels and/or aerogels. It also relates to co-polymeric gels and/or aerogels that include amide, imide, urea, and carbamic-anhydride groups, which may be useful not only in conventional aerogel applications, for example as thermal insulators, but also as precursors to the novel compositions. Additionally, it also relates to methods for producing said precursors and said compositions, and to methods for using them in gas separations such as in the selective capture and sequestration of carbon dioxide.

BACKGROUND AND SUMMARY OF THE INVENTION

Atmospheric $CO_2$ is part of the carbon cycle, in which life plays a key role. For eons, the $CO_2$ concentration was balanced by earth's oceans and ecosystems (phytoplankton, rainforests). A recent third factor with accelerating significance is related to the massive combustion of fossil fuels. According to the Scripps Institute of Oceanography, the $CO_2$ concentration increased from ca. 315 ppm in March 1958 to 409 ppm in April 2016. Increasing concentrations of atmospheric $CO_2$ contribute to global warming, a dangerous prospect for life on Earth. With the current rate, it is estimated that 2,000-3,000 mega tons of anthropogenic $CO_2$ will be injected into the atmosphere in the next two centuries. That amount is about what was injected into the atmosphere over a period of one million years by the Siberian Traps, and is believed to have caused the Great Permian Extinction in which 90% of all life on earth perished.

Clearly, $CO_2$ capture and sequestration (CCS) is rapidly becoming an issue of survival for the human species. Since anthropogenic $CO_2$ production is related to combustion, there are two stages where $CO_2$ capture is relevant: pre-combustion (e.g., of $CO_2$ from $H_2$ in fuel/air mixtures), and post-combustion (of $CO_2$ from the flue gas). Regarding global warming, post-combustion CCS is most important. For the past 60 years, the most well-established industrial method for removing $CO_2$ has involved the use of aqueous amine solutions. That method works well in pre-combustion reducing environments, while the oxidizing environment of the post-combustion flue gas degrades the amine. The second major approach to CCS uses microporous sorbents, which, owing to their highly accessible surface areas and low heat capacities, are deemed promising candidates for gas separation. Furthermore, since the adsorption properties of those porous sorbents are due to relatively weak Van der Waals forces, as opposed to covalent bonding in the case of amines, regeneration of the $CO_2$ scrubber is more energy efficient, and thereby it contributes minimally in terms of additional $CO_2$ in the atmosphere.

There are good thermodynamic and kinetic reasons why microporous materials are suitable for gas separation, such as separation of $CO_2$. The area has been pursued intensely for a number of years, and advances have been reported in numerous high-profile publications. A persistent problem plaguing the reported materials is the difficulty of fabricating them into useful forms. For example, the concluding paragraph of a recent publication on the subject teaches that one approach for fabrication into useful forms is dispersion of microporous materials in other macroporous supports such as cellulose filter paper (see, Jiang, S., et al., "Porous Organic Molecular Solids by Dynamic Covalent Scrambling," *Nature Communications,* 2011, 2:207-214). Clearly, this presents a major issue of asymmetry. There is something missing if one has to involve an over-a-century old technology in order to make use of cutting edge materials. Accordingly, one embodiment of the invention herein provides multiscale monolithic polymeric aerogel materials that provide a solution to the problem of packaging microporous materials in practical forms useful for gas separation and sequestration, particularly $CO_2$, as described below. Another embodiment provides a method of producing said polymeric aerogel materials.

Current commercial microporous sorbents include mainly zeolites and activated carbon, and are used pre-combustion for $H_2$ purification and removal of $CO_2$ from natural gas. Capacities do not seem to be high enough for $CO_2$ scrubbing from post-combustion flue gas. Along these lines, during the last decade, numerous other classes of microporous solids have been investigated, each with its unique advantages and issues. First, in the spirit of traditional zeolites, new microporous inorganic materials have included metal organic frameworks (MOF), whose limited physicochemical stability has encouraged research into conjugated microporous polymers (CMP), hyper cross-linked polymers (HCP), microporous organic polymers (MOP), porous aromatic frameworks (PAF), covalent organic frameworks (COF), porous organic frameworks (POF), covalent organic polymers (COP), porous organic polymers (POP), and porous polymer frameworks (PPF). The central idea in the design of micropores in all those materials is molecular-level rigidization via crystallization, or via spatial fixing of polymeric chains by using rigid multifunctional monomers. A special place in the last category, which became the point of conceptual departure for the invention disclosed herein, is occupied by a large variety of polymers derived from tetra para-substituted tetraphenyl methane, and includes, for example, covalent organic polymers based on azo-bridging, nanoporous polymers based on N-heterocyclic carbenes, and microporous organic polyimides. Furthermore, in order to increase interactions with the adsorbate, oftentimes the efficiency of the adsorbent is augmented by heteroatoms or polar groups incorporated into the polymer network (e.g., $NH_2$, OH, $NO_2$, COOH, and $SO_3$).

Microporous carbons, on the other hand, are chemically inert and physiochemically stable. Classical $CO_2$ adsorbents have variable pore size distributions ranging from macro to micro, and are derived from carbonization and activation of renewable biomass precursors such as coconut husk, bamboo, wood peat, cellulose, and the like. Advanced porous carbons for $CO_2$ adsorption are derived from synthetic polymers, which allow tunable pore systems and incorporation of nitrogen that augments $CO_2$ sorption.

Owing to extensive crosslinking, most designer sorbent materials undergo precipitation as part of their synthetic protocol, and are obtained as powders. For practical systems, though, powders must be packaged in ways that allow easy handling, low pressure drops, fast heat and mass transfer and high contact area with the adsorbate. At this point, drawing analogies with systems having similar requirements (e.g., chromatographic columns, gas-phase fuel cells, and catalytic converters), an answer to the quest for practical packaging is monolithic, yet nanostructured adsorbers with hierarchical porosity: macropores will permit fast mass transfer to the active sites, and micropores will provide the thermodynamic and kinetic parameters for separation.

Ideally, monolithicity and hierarchical porosity should all be introduced in one step. Aerogels constitute one class of materials that is believed to fit this bill. Aerogels are made by drying wet-gels under conditions that preserve their size, shape and nanomorphology. Wet-gels are prepared via sol-gel chemistry, whereas multifunctional monomers react in a suitable solvent and yield crosslinked polymers that phase-separate into tiny primary nanoparticles that aggregate into the continuous aerogel skeletal framework. Aerogels can be inorganic (e.g., silica) or organic (e.g., polymeric). Several organic polymer aerogels derived from aromatic monomers have been known to be carbonizable to robust monolithic nanoporous carbons, referred to as carbon aerogels. Carbon aerogels combine the desirable chemical inertness and physicochemical stability of carbon adsorbers with the aerogel monolithicity and hierarchical porous structure.

One embodiment of the invention provides carbonizable porous compositions that include gels and/or aerogels that comprise aspects of both microporous polymers and polymeric aerogels that share the common molecular feature of extensive crosslinking. In one illustrative aspect, these carbonizable porous compositions are based on the notion of designer polymers from polyfunctional monomers, such as, illustratively, rigid aromatic tetrafunctional monomers. In a related aspect, the carbonizable porous compositions that include gels and/or aerogels may optionally be synthesized from relatively inexpensive starting materials, such as readily available, "off-the-shelf" monomers. But it is understood that, as contemplated herein, various other monomers that are not readily available may be used as well, such as, for example, various tetraaryl methane derivatives. Illustrative examples of carbonizable porous compositions that include gels and/or aerogels that may be synthesized from readily available, "off-the-shelf" monomers, include, but are not limited to, gels and/or aerogels comprising polyamide, polyimide, polyurea, and polycarbamic-anhydride groups, which are derived from the reaction between a polyisocyanate compound and a polycarboxylic acid compound. For example, in Scheme 1 below is displayed the expected polymer, i.e., a polyamide, from the reaction of a polyisocyanate compound and a polycarboxylic acid compound (note: the example does not show the additional polyimide, polyurea, and polycarbamic-anhydrides described below). This particular example shows the reaction of a rigid aromatic trifunctional isocyanate, tris(4-isocyanatophenyl) methane (TIPM), with a rigid aromatic tetracarboxylic acid, pyromellitic acid (PMA), under sol-gel conditions. In Scheme 1, atom labeling refers to $^{13}C$ NMR peak assignments, and abbreviations refer to the monomeric fragments used in subsequent schemes. In the particular example in Scheme 1, owing to the special pairwise ortho relationship of the four COOH groups of PMA, the skeletal framework of the resulting gels and/or aerogels is made up of a co-polymer of polyamide, polyurea and polyimide (even though in Scheme 1 only the polyamide is shown). Besides the polyamide, polyurea and polyimide, also obtained in this process is the first intermediate of the reaction between the isocyanate and the carboxylate functional groups, namely, the carbamic-anhydride adduct, as is shown in subsequent schemes below (e.g., see Scheme 2). Thus, in a key aspect of this embodiment, porous compositions that include gels and/or aerogels are obtained, which comprise polyamide groups, polyurea groups, polyimide groups, and polycarbamic anhydride groups. These compositions are obtained via the reaction of a polyisocyanate compound and a polycarboxylic acid compound, wherein the polyisocyanate compound includes at least 2 isocyanate functional groups, and wherein the polycarboxylic acid compound includes at least 3 carboxylic acid functional groups at least 2 of which are positioned relative to each other in such a manner so as to be able to form an intramolecular anhydride. Additional details regarding the polyisocyanate compounds and the polycarboxylic acid compounds of the invention are described below in the Detailed Description section. Heating of the porous composition, which includes gels and/or aerogels comprising polyamides, polyureas, polyimides, and polycarbamic anhydrides, results in loss of $CO_2$, and formation of a nanoparticulate, porous second composition that includes gels and/or aerogels comprising polyamides, polyureas, and polyimides. Further details regarding the nanoparticulate, porous second composition are described below in the Detailed Description section. Upon pyrolysis of this nanoparticulate, porous second composition, successive thermal decomposition of the functional groups yields macroporous/microporous carbon gels and/or aerogels. In one important aspect of the invention, the micropore surface area in these carbon gels and/or aerogels is increased several-fold by subjecting the carbon gels and/or aerogels to reactive etching at high temperatures. For example, reactive etching with $CO_2$ results in quadrupling of the micropore surface area, as described in the examples below. Reactive etching may be carried out using $CO_2$ or other etching agents known in the art, such as $O_2$, air, and $H_2O$. In another aspect of the embodiment herein, all carbon gels and/or aerogels obtained herein (pre- and post-etching) are monolithic and exhibit enhanced $CO_2$ adsorption relative to other gases (e.g., $CH_4$, $H_2$, $N_2$). Without being bound by theory, it is believed that this enhanced $CO_2$ adsorption may be partly attributed to a 25% w/w post-pyrolytic retention of the N initially present in the co-polymeric precursor.

Scheme 1

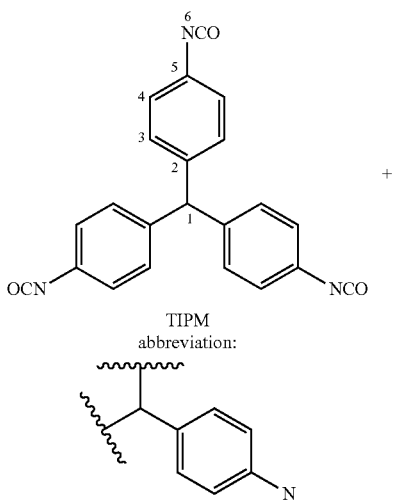

-continued

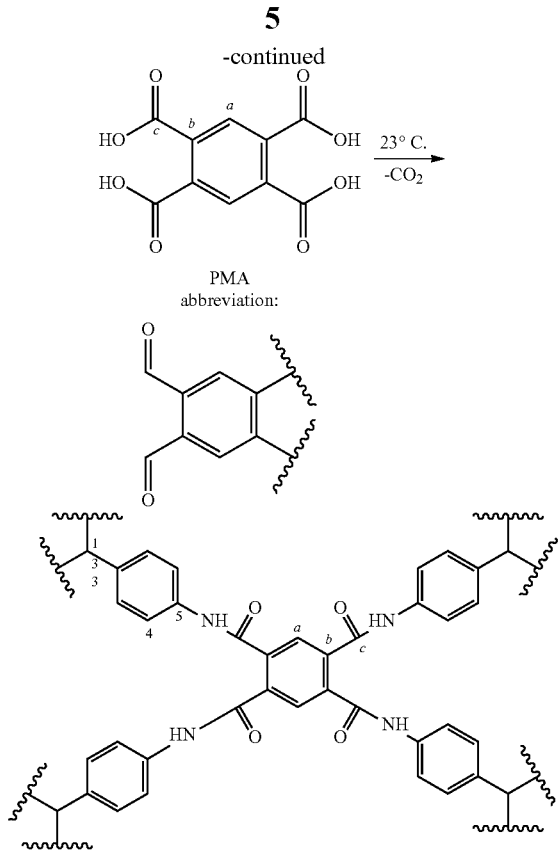

PMA
abbreviation:

Another embodiment of the invention provides novel microporous compositions designed from an integrated systems perspective, and a method for producing these novel microporous compositions in multiscale porous monolithic forms. In one aspect, these compositions comprise integrated macropores, which are desirable because they provide convective mass transfer to active sites in the compositions that comprise micropores on the walls of the porous monolith. In another aspect, in designing some of the novel compositions herein, molecular design principles were borrowed from microporous polymers (i.e., molecular rigidization by using multifunctional aromatic monomers). In another aspect, demonstrated herein is the preparation of microporous/macroporous carbon gels and/or aerogel compositions by pyrolysis of a three-way co-polymer comprising polyamide-polyimide-polyurea synthesized with inexpensive, readily available, off-the-shelf monomers. The evolution of the porosity of these compositions is followed via chemical and nanoscopic characterization throughout all stages of processing, as described below. This led to the discovery that both closed and open microporosity was created by stepwise pyrolytic decomposition of the constituents of the polymeric precursor. Subsequently, reactive etching, e.g., with $CO_2$, opened access to all pores. As stated earlier, reactive etching may be carried out using $CO_2$ or other etching agents known in the art, such as $O_2$, air, and $H_2O$. The carbon compositions disclosed herein possess a good balance of adsorption capacity for $CO_2$, and selectivity towards other gasses. For instance, in the Examples section below, it is shown that the selectivity towards $H_2$ (which can be as high as 928:1) is suitable for pre-combustion fuel purification. Relevant to post-combustion $CO_2$ capture and sequestration, the selectivity towards $N_2$ is in the range of about 17:1 to about 31:1. Consideration of these features in combination with the attractive $CO_2$ adsorption capacity, the low monomer cost, and the innate physicochemical stability of carbon, renders the novel compositions disclosed herein as good candidates from a practical standpoint.

The foregoing embodiments of the invention, and additional embodiments, are described in greater detail in the Detailed Description section and the Examples section below.

All publications cited throughout this application are incorporated herein by reference in their entirety. Indeed, throughout this description, including the foregoing description of related art and cited publications, as well as any and all publications cited in what follows below, it is to be understood that any and all publicly available documents described herein, including any and all cited U.S. patents, patent applications, and non-patent publications, are specifically incorporated by reference herein in their entirety. Nonetheless, the related art and publications described herein are not intended in any way as an admission that any of the documents described therein, including pending U.S. patent applications, are prior art to embodiments of the present disclosure. Moreover, the description herein of any disadvantages associated with the described products, methods, and/or apparatus, is not intended to limit the disclosed embodiments. Indeed, embodiments of the present disclosure may include certain features of the described products, methods, and/or apparatus without suffering from their described disadvantages.

Naturally, further objects of the invention are disclosed throughout other areas of the specification, drawings, and claims.

DETAILED DESCRIPTION

Figure 1:
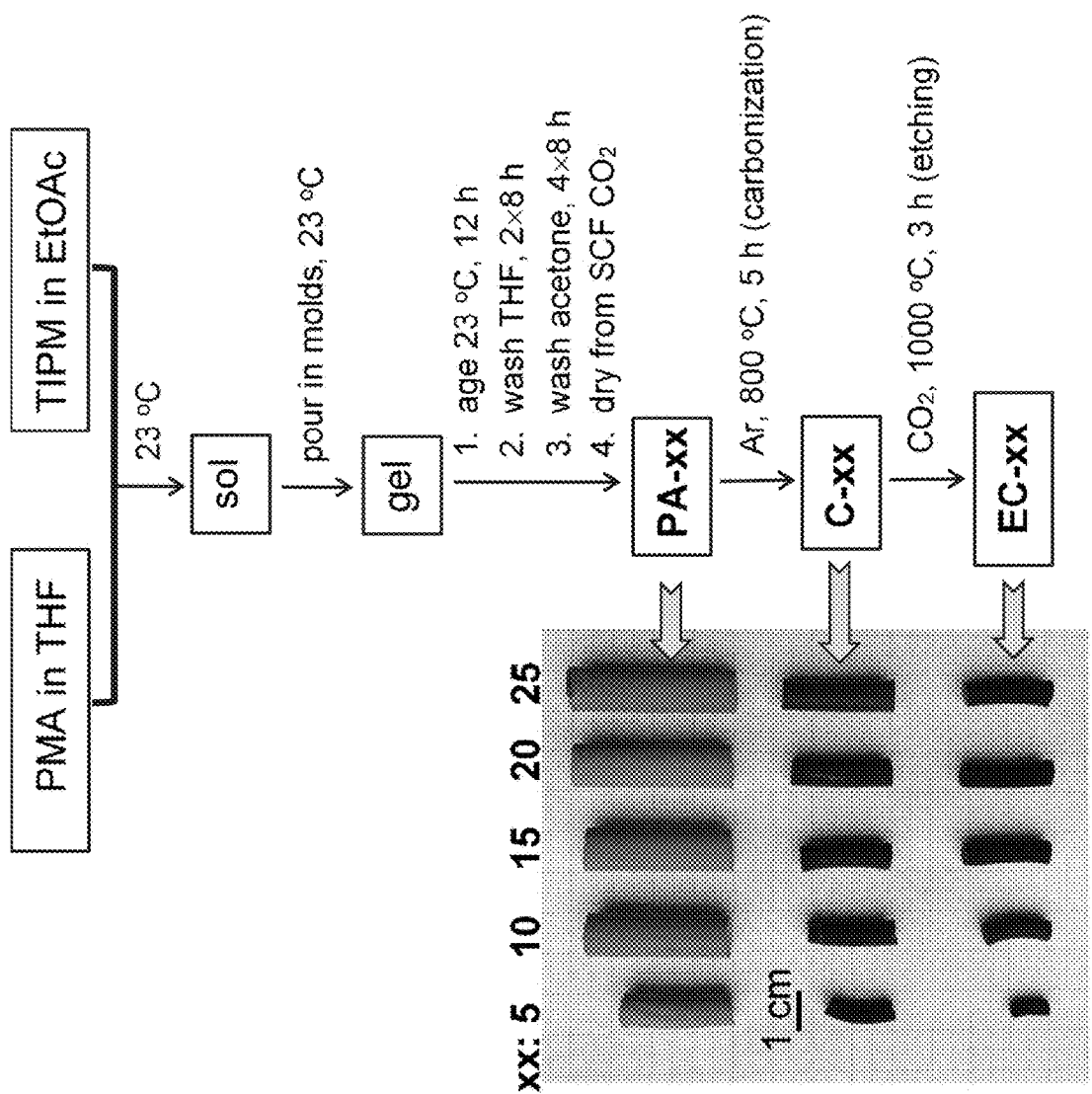
FIG. 1. Synthesis of polymeric aerogels from PMA/TIPM, followed by carbonization and etching (xx stands for the total weight percent of monomers in the solution).

Before the present methods, implementations and systems are disclosed and described, it is to be understood that this invention is not limited to specific components, specific methods, specific implementation, or to particular compositions, and as such may, of course, vary. It is also to be understood that the terminology used herein is for the purpose of describing particular implementations only and is not intended to be limiting. Neither are mechanisms which have been provided to assist in understanding the disclosure meant to be limiting.

One embodiment of the invention provides novel porous co-polymeric compositions comprising gels and/or aerogels, useful as starting materials for porous carbons; these compositions have the general formula (Ia) below:

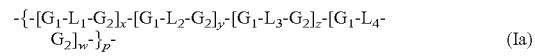

wherein:
$G_1$ is a moiety selected from the following groups: $C_1$-$C_{10}$ straight chain alkyl or branched alkyl or cycloalkyl, alkylaryl, aryl, heteroalkyl, heterocyclylalkyl, heteroaryl, and the like, each of which is optionally substituted;

$G_2$ is a moiety selected from the following groups: alkyl, cycloalkyl, heteroalkyl, heterocylcoalkyl, alkylaryl, cycloalkylaryl, alkylheteroaryl, cycloalkylheteroaryl, an arene ring system or a heteroarene ring system, and the like, each of which is optionally substituted;

$L_1$, $L_2$, $L_3$, and $L_4$ represent one or more linkages selected from any of amide, imide, urea, and carbamic-anhydride moieties, present in any random order, and/or any combinations thereof;

x, y, z, and w are integers independently ranging from 0 to 10; and, p is an integer ranging from 1 upwardly to 100, 200, 500, or even higher; preferably; preferably, p is an integer ranging from 1 to about 500.

In one aspect, compositions (Ia) possess structural attributes of microporosity and macroporosity.

In another aspect, compositions (Ia) are monolithic. In another aspect, compositions (Ia) are extensively cross-linked. In another aspect, compositions (Ia) comprise co-polymers of polyamide, polyurea, polyimide, and polycarbamic-anhydride adducts. Stated another way, the copolymeric compositions (Ia) comprise co-(amide, urea, imide, and carbamic anhydride adduct). Thus, these compositions (Ia) include at least one or more of polyamide groups, polyurea groups, polyimide groups, and polycarbamic anhydride groups, or combinations thereof. In one variation of the invention, these compositions include at least two or more of polyamide groups, polyurea groups, polyimide groups, and polycarbamic anhydride groups, or combinations thereof.

A related embodiment of the invention provides a method for production of the novel compositions (Ia) comprising co-polymeric gels and/or aerogels. This method includes the reaction step of mixing together, at room temperature in a suitable solvent (vide infra), a polyisocyanate compound of the general formula (II) with a polycarboxylic acid compound of the general formula (III) to give the co-polymeric composition comprising gels and/or aerogels of the general formula (Ia), according to the following equation:

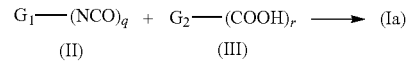

wherein:
$G_1$ is a moiety selected from the following groups: $C_1$-$C_{10}$ straight chain alkyl or branched alkyl or cycloalkyl, alkylaryl, aryl, heteroalkyl, heterocyclylalkyl, heteroaryl, and the like, each of which is optionally substituted;

$G_2$ is a moiety selected from the following groups: alkyl, cycloalkyl, heteroalkyl, heterocylcoalkyl, alkylaryl, cycloalkylaryl, alkylheteroaryl, cycloalkylheteroaryl, an arene ring system or a heteroarene ring system, and the like, each of which is optionally substituted;

q=2-6; and, r=3-8.

It is to be understood that the reaction step above of a polyisocyanate compound (II) with a polycarboxylic acid compound (III) can optionally include not only one of each, but also a mixture of two or more different polyisocyanate compounds (II) and a mixture of two or more different polycarboxylic acid compounds (III). Importantly, polycarboxylic acid compound (III) must include at least 3 carboxylic acid functional groups, of which at least 2 carboxylic acid functional groups must be positioned relative to each other, both geometrically and stereochemically, in such a manner so as to be able to form an intramolecular anhydride. Thus, illustratively, referring to the following two generic examples below, the two carboxylic acid groups in the top generic example are situated in 1,2-positions relative to each other, allowing them to form a 5-membered anhydride; likewise, the two carboxylic acid groups in the bottom generic example below are situated in 1,3-positions relative to each other, allowing them to form a 6-membered anhydride:

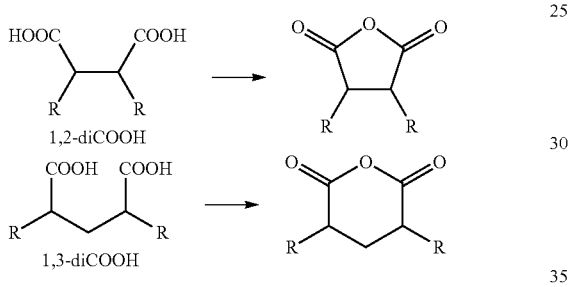

The polyisocyanate compound of formula (II) and polycarboxylic acid compound of formula (III) are mixed together in such amounts so that the ratio of isocyanate functional groups to carboxylic acid functional groups is about 1:1. Stated another way, the ratio of NCO:COOH of about 1:1 is the preferred ratio. However, it is understood that, as contemplated herein, other ratios within the range $0.5 \leq NCO:COOH \leq 2.0$ may be used, which may lead to different, but useful product distributions. A key aspect of this method of the invention, which leads to obtaining the copolymeric composition (Ia) comprising co-(amide, urea, imide, and carbamic anhydride adduct), is that the step of mixing together the polyisocyanate compound (II) with the polycarboxylic acid compound (III) should preferably be carried out without heating, i.e., at room temperature. Also, the step of mixing (II) and (III) is carried out in a suitable solvent, which can be a single solvent or a mixture of solvents. Illustratively, suitable solvents may be ether-type solvents (e.g., tetrahydrofuran (THF)), ester-type solvents (e.g., ethyl acetate (EtOAc)), amide-type solvents, ketone-type solvents, nitrile-type solvents, or mixtures of any of the foregoing solvents, or any other suitable organic solvents or mixtures of solvents that are chemically neutral towards the isocyanate and carboxylic acid reactive groups.

For the purpose of illustration, the following chemical formulae are provided below as examples of the polyisocyanate compounds (II) of the invention, wherein Ar is a 5-membered or 6-membered arene ring system or heteroarene ring system (it is understood that, as contemplated herein, the benzene rings shown below may be replaced with heteroarene rings as well):

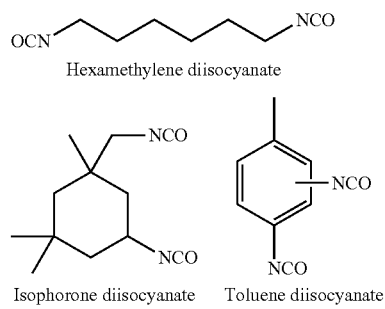

Hexamethylene diisocyanate

Isophorone diisocyanate    Toluene diisocyanate

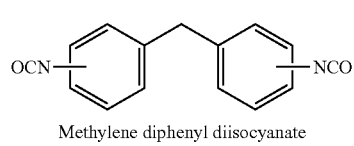

Methylene diphenyl diisocyanate

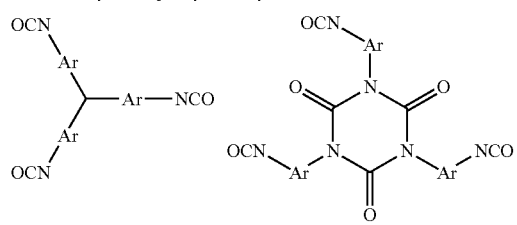

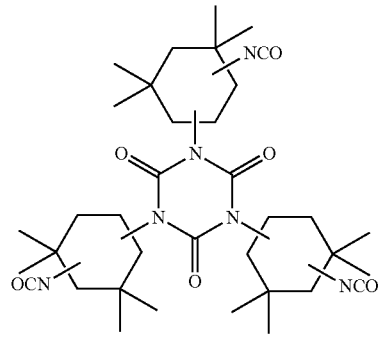

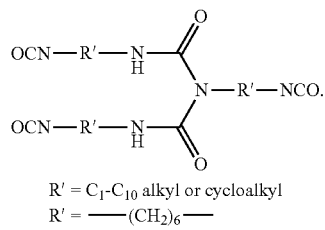

R' = $C_1$-$C_{10}$ alkyl or cycloalkyl
R' = —(CH$_2$)$_6$—

Illustrative examples of the 5-membered or 6-membered arene ring systems include, but are not limited to: benzenes; fused arene systems such as naphthalenes, anthracenes, phenanthrenes, and the like; bridged arene systems such as biphenyls, diphenymethanes, benzophenones, triphenylmethanes, and the like; heteroarene analogs of the foregoing; and combinations of the foregoing; all of which may be optionally substituted.

Also for the purpose of illustration, the following chemical formulae are given below as examples of the polycarboxylic acid compounds (III) of the invention, all of which are either commercially available, or may be readily obtained from the corresponding commercially available cyclic anhydride precursors shown:

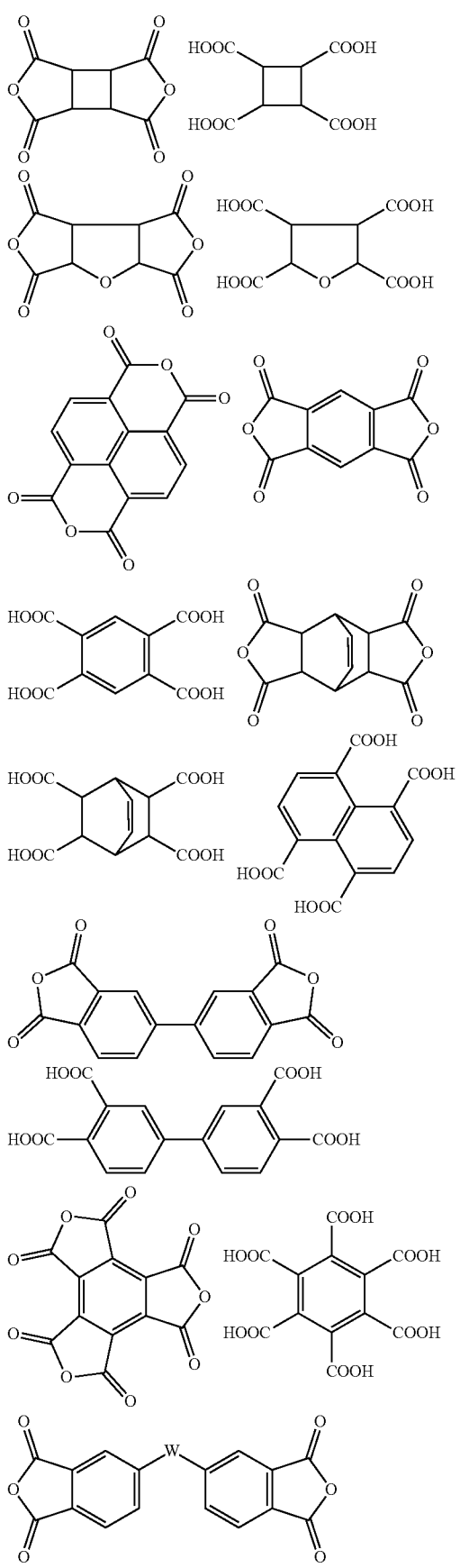

W = O, C = O, SO$_2$, C(CF$_3$)$_2$

It is understood that one of ordinary skill in the chemical arts could readily make or conceive of a nigh-infinite number of modifications to the foregoing illustrative chemical formulae of the polyisocyanate compounds (II) and the polycarboxylic acid compounds (III) that would come within the spirit of the invention, and that it would be impractical to attempt to list herein all such variations of contemplated chemical formulae.

Another embodiment of the invention provides novel nanoparticulate, porous co-polymeric compositions, comprising gels and/or aerogels, having the general formula (Ib) below:

$$-\{-[G_1-L_5-G_2]_s-[G_1-L_6-G_2]_t-[G_1-L_7-G_2]_u-\}_p- \tag{Ib}$$

wherein $G_1$ is a moiety selected from $C_1$-$C_{10}$ straight chain alkyl or branched alkyl or cycloalkyl, alkylaryl, aryl, heteroalkyl, heterocyclylalkyl, or heteroaryl, each of which is optionally substituted;

$G_2$ is a moiety selected from alkyl, cycloalkyl, heteroalkyl, heterocylcoalkyl, alkylaryl, cycloalkylaryl, alkylheteroaryl, cycloalkylheteroaryl, an arene ring system, or a heteroarene ring system, each of which is optionally substituted;

$L_5$, $L_6$, and $L_7$ represent one or more linkages selected from any of amide, imide, and urea moieties, present in any random order, and/or any combinations thereof;

s, t, and u are integers independently ranging from 0 to 10; and, p is an integer ranging from 1 to about 500.

Thus, co-polymeric compositions (Ib) comprise co-polymers of polyamide, polyurea, and polyimide. Stated another way, the copolymeric compositions (Ib) comprise co-(amide, urea, and imide). Compositions (Ib) include at least one or more of polyamide groups, polyurea groups, and polyimide groups, and/or any combinations thereof. In one variation of the invention, compositions (Ib) include at least two or more of polyamide groups, polyurea groups, and polyimide groups, and/or combinations thereof.

A related embodiment of the invention of novel co-polymeric compositions (Ib), which comprise polymeric gels and/or aerogels, is a method for preparation of compositions (Ib). This method includes the reaction step of heating a sample of a co-polymeric composition (Ia) at about 100-200° C., preferably at about 150° C., according to the following equation:

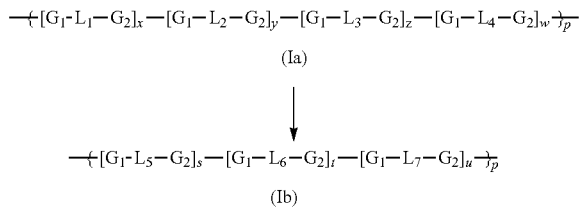

(Ia)

(Ib)

wherein $G_1$, $G_2$, $L_1$, $L_2$, $L_3$, $L_4$, $L_5$, $L_6$, $L_7$, x, y, z, w, s, t, u, and p are as defined above. This method entails loss of $CO_2$ from composition (Ia), giving a nanoparticulate composition (Ib), which comprises a co-poly(amide, imide, urea).

The following is provided for the sake of further illustration. Exemplary of the polyisocyanate compound of the general formula (II) above is a tris(isocyanatoaryl)methane of the formula (IV) below; and illustrative of the polycarboxylic acid compound of general formula (III) above is a 1,2,4,5-benzenetetracarboxylic acid of the formula (V) below; wherein when compounds (IV) and (V) are reacted together at room temperature, a co-polymeric composition (Ia) having the formula (VI) is formed according to the following equation:

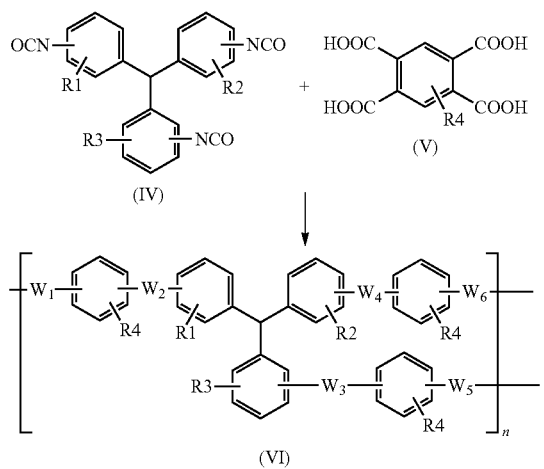

wherein the isocyanate groups of compound (IV) are independently attached to their respective aryl rings at the 2, 3, or 4-positions of the aryl rings;

wherein R1, R2, R3, and R4 are independently one or more substituents selected from H, alkyl, cycloalkyl, alkoxy, alkylthio, aryl, aryloxy, arylthio, each of which is optionally substituted, and halogen, nitro, cyano, and the like;

wherein $W_1$, $W_2$, $W_3$, $W_4$, $W_5$, and $W_6$ represent the same or different linking moieties selected from an amide group, a urea group, an imide group, a carbamic-anhydride group, and/or any combinations thereof; and, n is an integer ranging from 2 upwardly to 100, 200, 500, or even higher; preferably, n is an integer ranging from 2 to about 500.

Upon heating of co-polymeric composition (VI) at 100-200° C., preferably at 150° C., $CO_2$ is lost, and a co-polymeric composition (Ib) having the formula (VII) is obtained:

(VI)

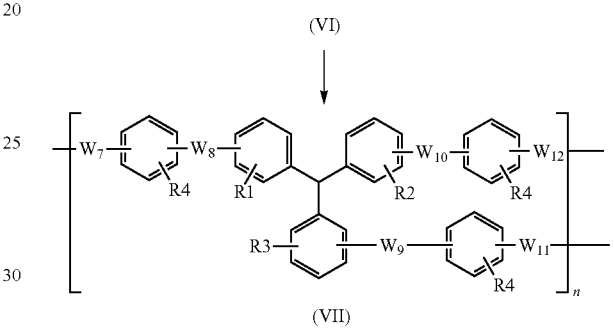

(VII)

wherein R1, R2, R3, R4, and n are the same as defined above; and, wherein $W_7$, $W_8$, $W_9$, $W_{10}$, $W_{11}$, and $W_{12}$ represent the same or different linking moieties selected from an amide group, a urea group, an imide group, and/or any combinations thereof.

In another embodiment of the invention, described herein are compositions that comprise monolithic carbon gels and/or aerogels that include both closed and open micropores, and a related process for preparing said compositions. This process comprises the step of pyrolyzing a co-polymeric composition (Ib), obtained as described above, at about 700° C. to about 1100° C., and preferably at about 800° C. The pyrolysis step is carried out for a sufficient length of time until a constant weight is achieved. Illustratively, this length of time may be a period ranging from about 3 hours to about 7 hours. An alternative process comprises a one-pot procedure that starts with a co-polymeric composition (Ia), obtained as described above, sequentially heating this composition to about 100-200° C., resulting in loss of $CO_2$, then raising the temperature further to about 700° C. to about 1100° C. to carry out the pyrolysis step. The resultant porous carbon compositions obtained from the pyrolysis step possess a nanostructured form in which at least 70% of the surface area measured by the $N_2$ sorption porosimetry method at 77 K is assigned to micropores. Further details of these compositions and the process steps to obtain them are included below and in the Examples section.

In another embodiment of the invention, described herein are compositions that comprise monolithic open-pore carbon gels and/or aerogels, and a related process for preparing said compositions. The process comprises the step of obtaining a composition comprising a monolithic carbon gel and/or aerogel that includes both closed and open micropores, prepared as described in the preceding paragraph, followed by the step of reactive etching via pyrolysis under an atmosphere of $CO_2$ at a temperature ranging from about 900° C. to about 1100° C., and preferably at about 1000° C., for a period ranging from about 2 hours to about 4 hours, and preferably for about 3 hours. Besides using $CO_2$ as the reactive etching agent, other etching agents known in the art may be used as well, such as $O_2$, air, and $H_2O$. In one important aspect, the resultant open-pore carbon gels and/or aerogels have an increased micropore surface area, which can be as much as quadruple, or more than quadruple, the micropore surface area prior to reactive etching. The resultant porous carbons possess a nanostructured form in which at least 60% of the surface area measured by the $N_2$ sorption porosimetry method at 77 K is assigned to micropores.

In another embodiment of the invention, described herein is a method for selective separation and sequestration of $CO_2$ gas from mixtures with other gasses. This method comprises the step of passing the mixtures of gasses through the "pre-reactive etching" composition comprising carbon gels and/or aerogels that includes both closed and open micropores, described above and in what follows, or through the "post-reactive etching" composition comprising open-pore carbon gels and/or aerogels, described above and in what follows. Illustratively, the mixture of gasses may include, but is not limited to, $CO_2$, $CH_4$, $H_2$, and $N_2$. One use of this method may be in the selective separation and sequestration of $CO_2$ gas especially from post-combustion mixtures of gasses. Another use of this method may be in the pre-combustion purification of fuel gas by selective separation and sequestration of $CO_2$. Illustratively, the fuel gas being purified may include, but is not limited to, $CO_2$ and $H_2$. Further details of this method for selective separation and sequestration of $CO_2$ gas are described below and in the Examples section.

Provided in the following are additional embodiments and specific illustrative examples of the invention disclosed herein.

One embodiment of the invention provides novel compositions comprising microporous co-polymeric materials designed from an integrated systems perspective, and a method for producing these novel compositions in multi-scale porous monolithic forms. These novel compositions include designer materials that provide an approach towards $CO_2$ capture and sequestration (CCS). In one aspect, these compositions comprise carbon gels and/or aerogels that are obtained by pyrolytic conversion of co-polymeric gel and/or aerogel precursors. Characteristic of these compositions comprising carbon gels and/or aerogels are added physicochemical stability and dramatically increased microporosity. In one aspect, microporosity is increased dramatically if the backbone of the co-polymeric aerogel precursor consists of a random co-polymer with functional groups that decompose at different temperatures. This is illustrated herein with polymeric aerogels (PA-xx) synthesized via a room-temperature reaction of an aromatic triisocyanate with pyromellitic acid, as is shown in Scheme 1. Using solid-state CPMAS $^{13}C$ and $^{15}N$ NMR, it was found that the skeletal framework of PA-xx was a statistical co-polymer of polyamide, polyurea, and polyimide, and also contained the primary condensation intermediate, a carbamic-anhydride adduct. Stepwise pyrolytic decomposition of those components yielded carbon gels and/or aerogels with both open and closed microporosity. The open micropore surface areas of those "as-prepared" carbon aerogels had increased to 340 $m^2\ g^{-1}$ (from <15 $m^2\ g^{-1}$ in PA-xx). Based on skeletal density data, it was discovered that reactive etching with $CO_2$ at high temperatures, e.g., 1000° C., opened access to the closed pores, and the micropore area increased by almost four-fold, up to 1150 $m^2\ g^{-1}$ (out of 1750 $m^2\ g^{-1}$ of total Brunauer-Emmett-Teller (BET) surface area). Such compositions comprising carbon gels and/or aerogels demonstrated a good balance of adsorption capacity for $CO_2$ (up to 4.9 mmol $g^{-1}$), and selectivity towards other gasses. The selectivity for $CO_2$ vs. $H_2$ (up to 928:1) is suitable for pre-combustion fuel purification. Relevant to post-combustion CCS, the selectivity for $CO_2$ vs. $N_2$ was in the 17:1 to 31:1 range. Without being bound by theory, in addition to factors typically considered to explain differential gas sorption (e.g., kinetic diameters, quadrupole moments, and polarizabilities of the adsorbates), it is also suggested here that $CO_2$ is preferentially engaged by pyridinic and pyridonic N on carbon (identified with XPS) in an energy-neutral surface reaction. Relatively high uptake of $CH_4$ (2.16 mmol $g^{-1}$ at 0° C./1 bar) may be attributed to its high polarizability. Overall, high $CO_2$ selectivities, in combination with the attractive $CO_2$ adsorption capacity, low monomer cost, and the innate physicochemical stability of carbon render the compositions disclosed herein as good candidates for practical consideration.

In one embodiment of the invention, a rigid aromatic polyisocyanate compound may be used, such as, illustratively, the tris(isocyanatoaryl)methane of the formula (IV) below, wherein the isocyanate groups are independently attached to their respective aryl rings at the 2, 3, or 4-positions of the aryl rings, and wherein R1, R2, and R3 are independently one or more substituents selected from H, alkyl, cycloalkyl, alkoxy, alkylthio, aryl, aryloxy, arylthio, each of which is optionally substituted, and halogen, nitro, cyano, and the like:

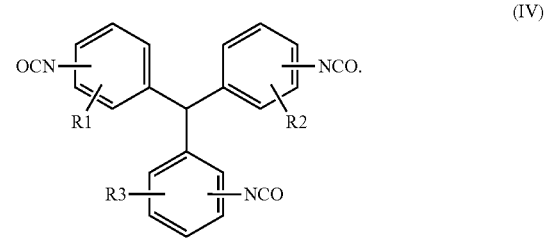

(IV)

A specific example of polyisocyanate compound (IV) is the readily available compound tris(4-isocyanatophenyl)methane, commonly known as TIPM.

In another embodiment of the invention, a rigid aromatic polycarboxylic acid compound may be used, such as, illustratively, the benzenetetracarboxylic acid (V) below, wherein R4 is one or more substituents selected from H, alkyl, cycloalkyl, alkoxy, alkylthio, aryl, aryloxy, arylthio, each of which is optionally substituted, and halogen, nitro, cyano, and the like:

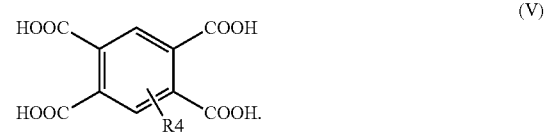

(V)

A specific example of compound (V) is pyromellitic acid (R4=H). Other representative rigid aromatic polycarboxylic acid compounds that may be used are polycarboxylic acids of fused arene systems such as naphthalenes, anthracenes, phenanthrenes, and the like; bridged arene systems such as biphenyls, diphenymethanes, benzophenones, triphenylmethanes, and the like; heteroarene analogs of the foregoing; and combinations of the foregoing. Examples are 1,4,5,8-naphthalenetetracarboxylic acid and 3,3',4,4'-benzophenonetetracarboxylic acid. However, as stated earlier, the polycarboxylic acids of the invention must include at least 3 carboxylic acid functional groups, of which at least 2 carboxylic acid functional groups must be positioned relative to each other, both geometrically and stereochemically, in such a manner so as to be able to form an intramolecular anhydride.

Another embodiment of the invention provides a process for preparing a monolithic, nanoparticulate, co-polymeric gel and/or aerogel composition that includes at least one or more of polyamide groups, polyurea groups, polyimide groups, or combinations thereof. In one variation, the process results in a monolithic co-polymeric gel and/or aerogel composition that includes at least two or more of polyamide groups, polyurea groups, polyimide groups, or combinations thereof. This process comprises the step of mixing together at room temperature in a suitable solvent a polyisocyanate compound, as described above, and a polycarboxylic acid compound, as described above, in such amounts so that the ratio of isocyanate functional groups to carboxylic acid functional groups is about 1:1, and subsequently subjecting the product to heating at about 100-200° C.

In other embodiments of the invention, described herein is a monolithic, nanoparticulate carbon gel and/or aerogel composition that includes both closed and open micropores, and a process for preparing said composition. The process comprises the steps of: (a) mixing together in a suitable solvent at room temperature a polyisocyanate compound, as described above, and a polycarboxylic acid compound, as described above, in such amounts so that the ratio of isocyanate functional groups to carboxylic acid functional groups is about 1:1; (b) heating the resulting product at about 100-200° C., to lose $CO_2$ and produce a nanoparticulate co-polymeric gel and/or aerogel composition that includes one or more of polyamide groups, polyurea groups, polyimide groups, and/or combinations thereof; and, (c) subjecting the product obtained in (b) to pyrolysis under an inert atmosphere at a temperature ranging from about 700° C. to about 1100° C., for a sufficient length of time until a constant weight is achieved; illustratively, this may be a period ranging from about 3 hours to about 7 hours.

In other embodiments of the invention, described herein is a monolithic, nanoparticulate, open-pore carbon gel and/or aerogel composition, and a process for preparing the same. The process comprises the steps of obtaining a monolithic carbon aerogel that includes both closed and open micropores as described in the preceding paragraph, followed by the step of reactive etching via pyrolysis under an atmosphere of $CO_2$, or $O_2$, or air, or $H_2O$, preferably $CO_2$, at a temperature ranging from about 900° C. to about 1100° C., for a period ranging from about 2 hours to about 4 hours, resulting in the open-pore carbon gel and/or aerogel composition. In one aspect, this composition has an increased micropore surface area. The increased micropore surface area can be as much as quadruple, or more than quadruple, the micropore surface area prior to reactive etching.

In another embodiment of the invention, described herein is a method for selective separation and sequestration of $CO_2$ gas from mixtures with other gasses. This method comprises the step of passing the mixtures of gasses through the "pre-reactive etching" carbon gel and/or aerogel composition of the invention, or through the "post-reactive etching" open-pore carbon gel and/or aerogel composition of the invention. One use of this method may be in the selective separation and sequestration of $CO_2$ gas especially from post-combustion mixtures of gasses. Another use of this method may be in the pre-combustion purification of fuel gas by selective separation and sequestration of $CO_2$.

While the novel technology herein has been illustrated and described in detail in the foregoing description, and in the following examples and the figures herein, the same is to be considered as illustrative and not restrictive in character. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

EXAMPLES

The following examples further illustrate specific embodiments of the invention. However, the following examples should not be interpreted in any way to limit the invention.

Example 1

Synthesis of polymeric aerogels from TIPM and PMA. Materials design was based on the well-known reaction of isocyanates with carboxylic acids to provide amides. That reaction has been utilized for the synthesis of polyamide aerogels from TIPM and trimesic acid (see, Leventis, N. et al., *J. Mater. Chem.*, 2011, 21:11981-11986), and more recently from TIPM and ferrocene dicarboxylic acid (see, Saeed, A. M., et al., *Chem. Mater.*, 2016, 28:4867-4877). That reaction was implemented herein with PMA. FIG. 1 summarizes the synthetic protocol along with subsequent carbonization and reactive etching. The photograph in FIG. 1 shows the resulting materials at various stages of processing. Gelation was carried out at room temperature in THF/ethyl acetate (EtOAc) mixtures. THF was chosen because it is a good solvent for PMA. EtOAc was introduced in the reaction mixture by TIPM, which is supplied as a 27% w/w solution in anhydrous EtOAc, and was used as received. The two reagents were used in the required stoichiometric ratio of PMA:TIPM=3:4 mol/mol (Scheme 1). The total monomer concentration (TIPM+PMA) was bracketed between 5% and 25% w/w by varying the amount of THF (see Table 1). Below that concentration range solutions did not gel at room temperature. For example, 2.5% solutions gelled at 60° C. after prolonged incubation, however after pyrolysis of the resulting aerogels evidence of internal structural collapse was observed. The upper limit was set by the fact that PMA is not soluble in EtOAc; above that limit the amount of THF needed for dilution was below what was required in order to keep PMA in solution. Gelation times (included in Table 1) varied from 15 min to 3 h 15 min, in reverse order relative to the solution concentration. Wet-gels were washed with THF, solvent-exchanged with acetone, extracted with liquid $CO_2$ in an autoclave, and were dried by converting the pore-filling $CO_2$ to a supercritical fluid (SCF) that was vented off as a gas. The resulting Polymeric Aerogels are referred to as PA-xx, wherein xx denotes the total monomer (PMA+TIPM) weight percent concentration in the solution. According to the above, 5≤xx≤25, and for the purposes of this study, xx was set at 5 levels: 5, 10, 15, 20, 25.

TABLE 1

Formulations and gelation times of PA-xx aerogels.

| | PMA | | | | Desmodur RE | | TIPM | | | THF | | |
|---|---|---|---|---|---|---|---|---|---|---|---|---|
| Sample | mass (g) | volume [a] (mL) | mmol | C (M) | volume (mL) | mass [b] (g) | mass [c] (g) | mmol | C (M) | mass (g) | volume (mL) | gelation time [d] |
| PA-2.5 | 0.190 | 0.116 | 0.75 | 0.030 | 1.330 | 1.359 | 0.367 | 1.00 | 0.040 | 20.7 | 23.3 | ~4 h |
| PA-5   | 0.190 | 0.116 | 0.75 | 0.061 | 1.330 | 1.359 | 0.367 | 1.00 | 0.081 | 9.59 | 10.8 | 3 h 15 min |
| PA-10  | 0.190 | 0.116 | 0.75 | 0.125 | 1.330 | 1.359 | 0.367 | 1.00 | 0.167 | 4.02 | 4.52 | 2 h 10 min |
| PA-15  | 0.190 | 0.116 | 0.75 | 0.193 | 1.330 | 1.359 | 0.367 | 1.00 | 0.257 | 2.16 | 2.43 | 1 h 30 min |
| PA-20  | 0.190 | 0.116 | 0.75 | 0.264 | 1.330 | 1.359 | 0.365 | 1.00 | 0.352 | 1.23 | 1.39 | 45 min |
| PA-25  | 0.190 | 0.116 | 0.75 | 0.339 | 1.330 | 1.359 | 0.367 | 1.00 | 0.453 | 0.67 | 0.76 | 15 min |

[a] The volume of PMA was calculated based on its density measured with helium pycnometry (1.642 g cm$^{-3}$).
[b] The mass of commercial Desmodur RE was calculated based on its density as measured in Applicants' laboratory (1.022 g cm$^{-3}$).
[c] The mass of TIPM in Desmodur RE was calculated based on the 27% w/w concentration given by the manufacturer.
[d] All gelation times, except for PA-2.5, are at room temperature. PA-2.5 gelled at 60° C.

Example 2

Figure 2:
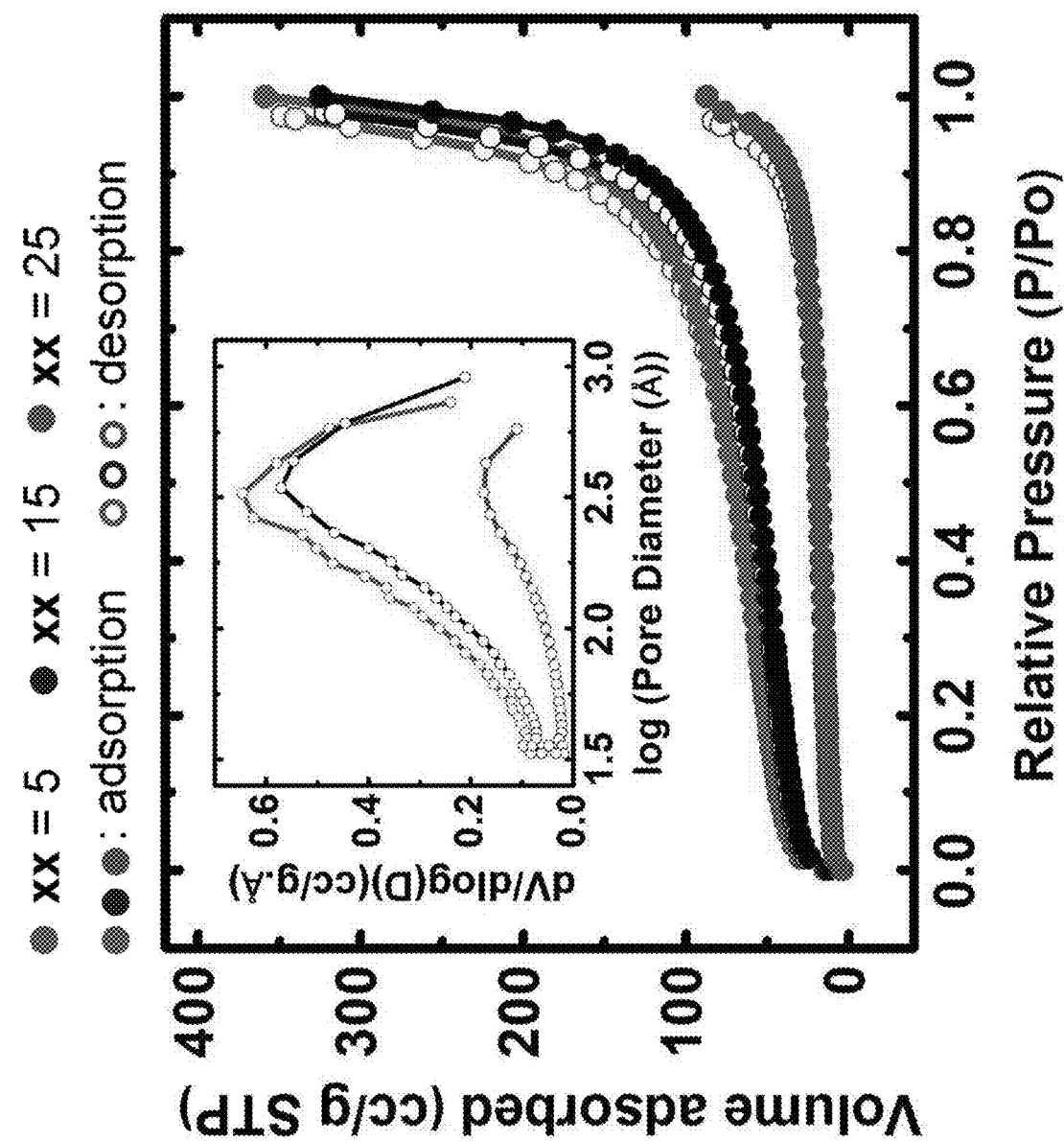
FIG. 2. $N_2$-sorption isotherms at 77 K of three PA-xx aerogels prepared with the lowest (xx=5), middle (xx=15) and highest (xx=25) concentration solutions used herein. Inset: Corresponding pore-size distributions in the 1.7-300 nm range by the BJH desorption method.

Characterization of polymeric aerogels: General material properties and the porous structure of PA-xx. PA-xx shrunk during drying, in reverse order relative to the solution concentration (FIG. 1). Linear shrinkage varied from 35% (xx=5) to 13% (xx=25) relative to the molds. Without being bound by theory, it is believed that, at first approximation, decreasing shrinkage may be attributed to more extensive chemical bonding along the skeletal framework as xx increased. Owing to decreasing shrinkage, although solutions at xx=25 were five-fold more concentrated than those at xx=5, the resulting PA-25 aerogels were less than 3× as dense as PA-5 (bulk densities: $\rho_b$=0.330±0.008 g cm$^{-3}$ versus $\rho_b$=0.139±0.008 g cm$^{-3}$, respectively). (Bulk densities, and other data relevant to PA-xx are summarized in Table 2.) Skeletal densities ($\rho_s$) varied in the 1.31-1.32 g cm$^{-3}$ range in no particular order, and open porosities, Π, calculated as percent of empty space via Π=100×($\rho_s$−$\rho_b$)/$\rho_s$, varied from 89% v/v (PA-5) to 75% v/v (PA-25). Quantitative evaluation of the pore structures relied on N$_2$-sorption. All isotherms were similar in shape (FIG. 2) with narrow hysteresis loops and without saturation plateaus, indicating mostly macroporous materials. Indeed, for all xx, the specific pore volume in the 1.7-300 nm range, calculated with the BJH desorption method (see, Barrett, E., et al., J. Am. Chem. Soc. 1951, 73:373-380) was always less than 8% of the total specific pore volume calculated via $V_{Total}$=(1/$\rho_b$)−(1/$\rho_s$) (Table 2). Average pore diameters, calculated via the 4 $V_{Total}$/σ method, were in the 100-200 nm range. Pore size distributions for the low fraction of pores that happened to be in the 1.7-300 nm range were calculated with the BJH equation; they were very broad with maxima in the 27-38 nm range for all xx (see Inset in FIG. 2 and Table 2). The BET surface areas, a, started higher at low xx (e.g., σ=176 m$^2$ g$^{-1}$ in PA-5) and decreased by four-fold as density increased (σ=46 m$^2$ g$^{-1}$ in PA-25). Interestingly, an 8-14% of the BET surface area was attributed to micropores (calculated with the Harkins and Jura model; see, Webb, P. A.; et al., "Analytical Methods in Fine Particle Technology;" Micromeritics Instrument Corporation: Norcross, Ga., U.S.A, 1997, 67-68), in increasing order with xx. Namely, despite the surface area of, for example, PA-25, being lower than that of the rest of the samples, the percent of that surface area that was attributed to micropores was higher.

TABLE 2

Characterization of the PA-xx aerogels.

| xx | linear shrinkage (%) [a, b] | bulk density, $\rho_b$ (g cm$^{-3}$) [a] | Skeletal density $\rho_s$ (g cm$^{-3}$) [c] | Π (% v/v) [d] | specific pore volume (cm$^3$ g$^{-1}$) | | |
|---|---|---|---|---|---|---|---|
| | | | | | $V_{Total}$ [e] | $V_{1.7-300\_nm}$ [f] | $V_{>300\_nm}$ [g] |
| 5  | 35.39 ± 0.95 | 0.139 ± 0.008 | 1.316 ± 0.073 | 89 | 6.43 | 0.504 | 5.93 |
| 10 | 20.88 ± 0.33 | 0.169 ± 0.003 | 1.306 ± 0.008 | 87 | 5.15 | 0.456 | 4.70 |
| 15 | 17.21 ± 0.26 | 0.246 ± 0.010 | 1.307 ± 0.004 | 81 | 3.30 | 0.468 | 2.83 |
| 20 | 13.73 ± 1.08 | 0.285 ± 0.007 | 1.319 ± 0.004 | 78 | 2.75 | 0.295 | 2.46 |
| 25 | 12.90 ± 0.46 | 0.330 ± 0.008 | 1.321 ± 0.002 | 75 | 2.27 | 0.117 | 2.16 |

| xx | BET surface area, σ (m$^2$ g$^{-1}$) [h] | average pore diameter (nm) | | particle radius (nm) | | |
|---|---|---|---|---|---|---|
| | | 4V/σ [i] method | BJH [j] method | r [k] | $R_1$ [l] | $R_2$ [m] |
| 5  | 176 (15) | 146 [10] | 31 [52] | 13 | 10.16 ± 0.55 | 54.95 ± 4.09 |
| 10 | 163 (17) | 126 [12] | 27 [47] | 14 | 9.74 ± 0.54 | 50.37 ± 3.11 |

TABLE 2-continued

Characterization of the PA-xx aerogels.

| 15 | 143 (14) | 92 [14] | 36 [66] | 16 | 10.85 ± 0.55 | 50.98 ± 1.91 |
| 20 | 91 (11) | 121 [13] | 38 [68] | 25 | 10.31 ± 1.09 | 43.57 ± 1.98 |
| 25 | 46 (6) | 198 [10] | 36 [65] | 49 | 12.17 ± 0.92 | 48.45 ± 2.26 |

[a] Average of 3 samples.
[b] Linear shinkage = 100 × (mold diameter − sample diameter)/(mold diameter).
[c] Single sample, average of 50 measurements.
[d] Porosity, $\Pi = 100 \times (\rho_s - \rho_b)/\rho_s$.
[e] Calculated via $V_{Total} = (1/\rho_b) - (1/\rho_s)$.
[f] Cumulative volume of pores between 1.7 nm and 300 nm from $N_2$-sorption data and the BJH desorption method.
[g] $V_{>300\,nm} = V_{Total} - V_{1.7\text{-}300\,nm}$.
[h] Numbers in (parentheses): micropore surface areas were calculated via t-plot analysis using the Harkins and Jura model.
[i] For the first number, V was taken equal to $V_{Total} = (1/\rho_b) - (1/\rho_s)$; for the number in [brackets], V was set equal to the maximum volume of $N_2$ absorbed along the isotherm as $P/Po \to 1.0$.
[j] From the BJH plots: first numbers are peak maxima; numbers in (parentheses) are full widths at half maxima.
[k] Particle radius, $r = 3/(\rho_s \times \sigma)$;
[l] $R_1$: radius of primary particles from SAXS;
[m] $R_2$: radius of secondary particles from SAXS.

Example 3

Characterization of polymeric aerogels (cont.): The skeletal framework of PA-xx. According to scanning electron microscopy (SEM—FIG. 4) all skeletal frameworks across the xx domain consisted of random assemblies of seemingly similar-size spherical particles. The presence of large voids supports the microporous character of the samples, as inferred from $N_2$-sorption above. A quantitative evaluation of the skeletal framework was obtained from small angle X-ray scattering (SAXS) data analyzed with the Baucage Unified Model (see, Beaucage, G., *J. Appl. Crystallogr.* 1995, 28:717-728; and, *J. Appl. Crystallogr.* 1996, 29:134-146) (see FIG. 3). All scattering profiles could be fitted in four regions: two power-laws and two Guinier knees. From the latter, the radii of primary and secondary particles ($R_1$ and $R_2$, respectively; included in Table 2) were calculated; the high-Q slope (Q: scattering vector) obeyed Porod's law; the values of the low-Q slopes were always lower than −3, which can be taken to mean that secondary particles were densely-packed surface-fractal assemblies of primary particles. Secondary particle radii were in the 44-55 nm range, in no particular order with xx. For low-density samples (i.e., at the low-end of the xx range) $R_1$ values agreed reasonably well with the radii of the smallest building blocks calculated from gas sorption data, r ($=3/(\rho_s \times \sigma)$—included in Table 2). For example, for PA-5, $R_1=10.2\pm0.5$ nm and r=17 nm. However, at higher xx values, r»$R_1$. For instance, for PA-25, r=49 nm, while $R_1=12.2\pm0.9$ nm. That kind of discrepancy (r»$R_1$) is not new (see, Chidambareswarapattar, C., et al., *Chem. Mater.* 2013, 25:3205-3224.): based on results from silica particles deliberately embedded in polymer (case of X-aerogels) (see, Mohite, D. P., et al., *Chem. Mater.* 2012, 24:3434-3448; and, Leventis, N., *Acc. Chem. Res.* 2007, 40:874-884), it has been concluded that when r»$R_1$, a primary skeletal network is formed fast, and then is coated with a layer of polymer formed by reaction of monomer remaining unreacted in the pores with "live" functional groups on the surface of the nanoparticles of the primary network. Since the primary particles underneath the new polymeric layer are still able to be "seen", it may be concluded that the latter had a different, in fact, lower density than that of the nanoparticles of the primary network. This is consistent with the fact that the percent microporosity (synonymous to free-volume porosity) increased as xx increased, that is, for more concentrated solutions. The monomer-to-network growth mechanism just described may be reminiscent of Ostwald ripening (see, Gupta, A., et al., *Soft Matter* 2016, 12:2826-2841), whereas the monomer/surface reaction is most exothermic at the points of negative curvature, i.e., at the contacts between primary particles, thereby new polymer accumulated and eventually filled the empty space between primary particles. Two independent experimental observations may support this conclusion: first, as was described above, the BET surface area decreased with increasing xx; and, second, as xx increased, r→$R_2$; for example, for PA-25, r≈$R_2$=48.45±2.26 nm (Table 2).

TABLE 3

Figure 3:
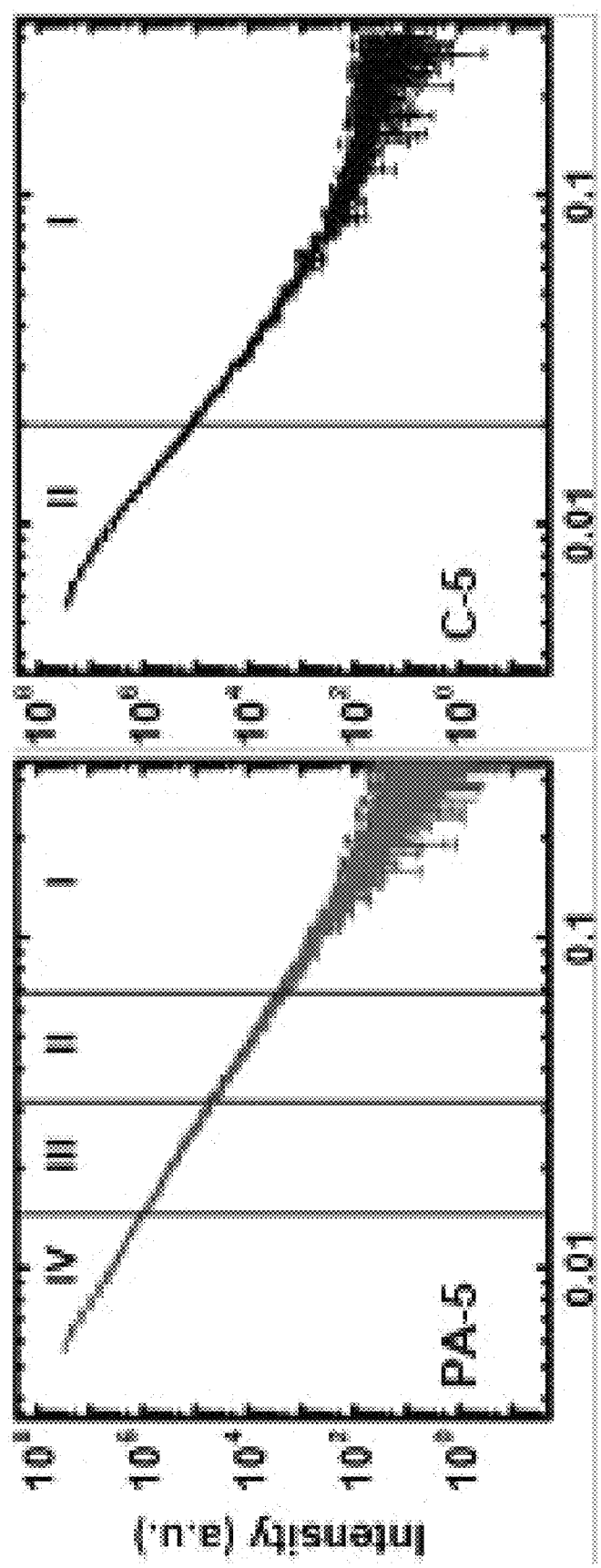
FIG. 3. Small angle x-ray scattering (SAXS) data for PA-xx and C-xx aerogels. SAXS profiles from selected polymeric aerogels (PA-xx, for xx=5, 15 and 25), and their respective carbon aerogels (C-xx).
Figure 3:
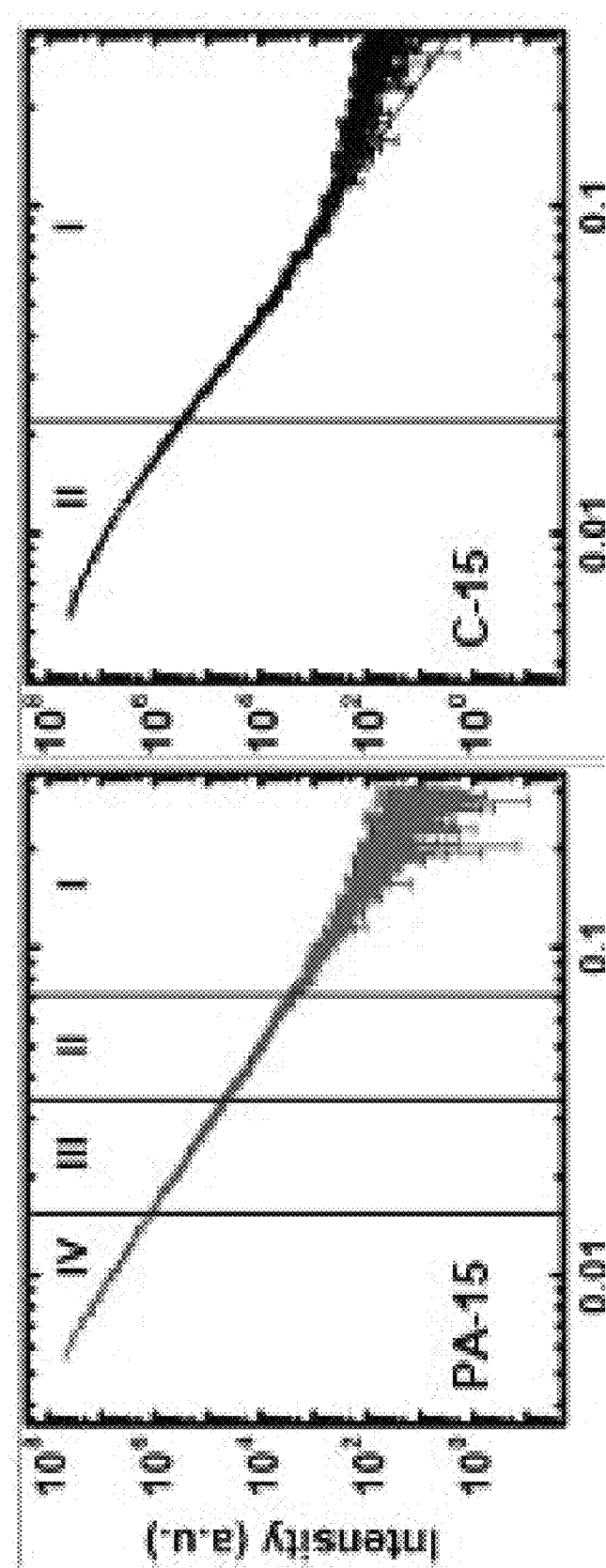
Figure 3:
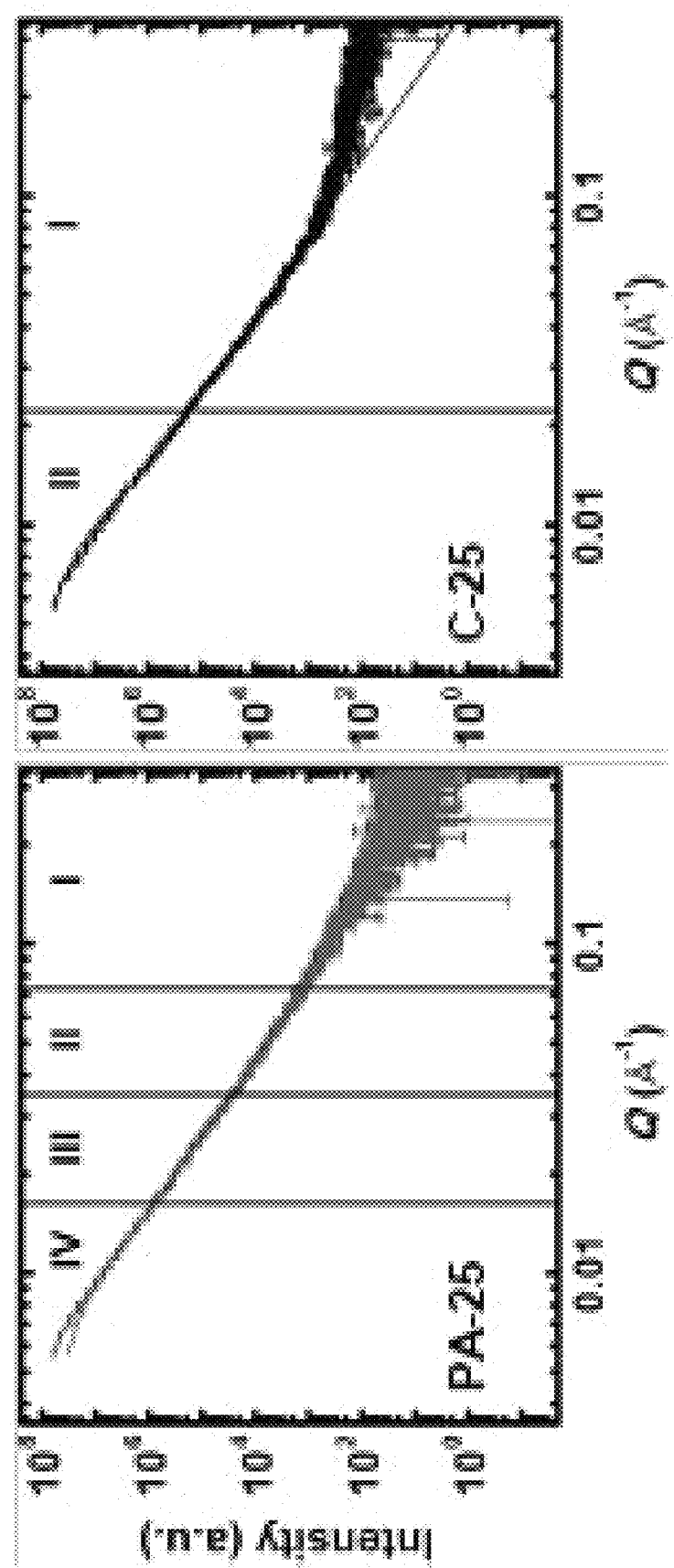

SAXS data obtained by fitting the scattering profiles of FIG. 3 using the Beaucage Unified Model[S,R-1]

| | | Primary Particles | | | Secondary Particles | |
|---|---|---|---|---|---|---|
| Sample xx | high-Q slope [a] | $R_G(I)$ [b] (nm) | $R_1$ [c] (nm) | low-Q slope [d] | $R_G(II)$ [e] (nm) | $R_2$ [f] (nm) |
| PA-xx | | | | | | |
| 5 | −4.05 ± 0.02 | 7.82 ± 0.42 | 10.16 ± 0.55 | −3.51 ± 0.09 | 42.31 ± 3.15 | 54.95 ± 4.09 |
| 10 | −4.23 ± 0.02 | 7.50 ± 0.41 | 9.74 ± 0.54 | −3.69 ± 0.16 | 38.79 ± 2.40 | 50.37 ± 3.11 |
| 15 | −4.00 ± 0.02 | 8.35 ± 0.42 | 10.85 ± 0.55 | −3.72 ± 0.11 | 39.26 ± 1.47 | 50.98 ± 1.91 |
| 20 | −4.25 ± 0.05 | 7.94 ± 0.84 | 10.31 ± 1.09 | −3.96 ± 0.29 | 33.55 ± 1.53 | 43.57 ± 1.98 |
| 25 | −4.22 ± 0.05 | 9.37 ± 0.71 | 12.17 ± 0.92 | −4.13 ± 0.30 | 37.31 ± 1.74 | 48.45 ± 2.26 |
| C-xx [g] | | | | | | |
| 5 | −4.20 ± 0.01 | 27.94 ± 1.16 | 36.28 ± 0.21 | — | — | — |
| 10 | −4.21 ± 0.01 | 24.19 ± 0.11 | 31.42 ± 0.14 | — | — | — |

TABLE 3-continued

SAXS data obtained by fitting the scattering profiles
of FIG. 3 using the Beaucage Unified Model[S.R-1]

| | | Primary Particles | | | Secondary Particles | |
|---|---|---|---|---|---|---|
| Sample xx | high-Q slope [a] | $R_G(I)$ [b] (nm) | $R_1$ [c] (nm) | low-Q slope [d] | $R_G(II)$ [e] (nm) | $R_2$ [f] (nm) |
| 15 | −4.21 ± 0.01 | 25.37 ± 0.18 | 32.95 ± 0.23 | — | — | — |
| 20 | −4.21 ± 0.01 | 24.74 ± 0.15 | 32.13 ± 0.19 | — | — | — |
| 25 | −4.20 ± 0.01 | 29.11 ± 0.14 | 37.80 ± 0.18 | — | — | — |

[S.R-1](a) Beaucage, G. *J. Appl. Crystallogr.* 1995, 28, 717-728.
(b) Beaucage, G. *J. Appl. Crystallogr.* 1996, 29, 134-146.
Referring to FIG. 3:
[a] From power-law Region I. Slopes <−4.00, signify primary particles with density-gradient boundaries.
[b] Radius of gyration of primary particles, $R_G(I)$, from Region II (first Guinier knee).
[c] Primary particle radii $R_1 = (R_G(I)/0.77)$.
[d] From power-law Region III. All slopes <−3, meaning surface fractal secondary particles; surface fractal dimension, $D_s$ = 6−|slope|.
[e] Radius of gyration of secondary particles, $R_G(II)$, from Region IV (second Guinier knee).
[f] Secondary particle radii, $R_2 = (R_G(II)/0.77)$.
[g] Within the accessible range of Q, scattering profiles of C-xx aerogels could be fitted only with a high-Q power law and one Guinier knee.

Example 4

Figure 5:
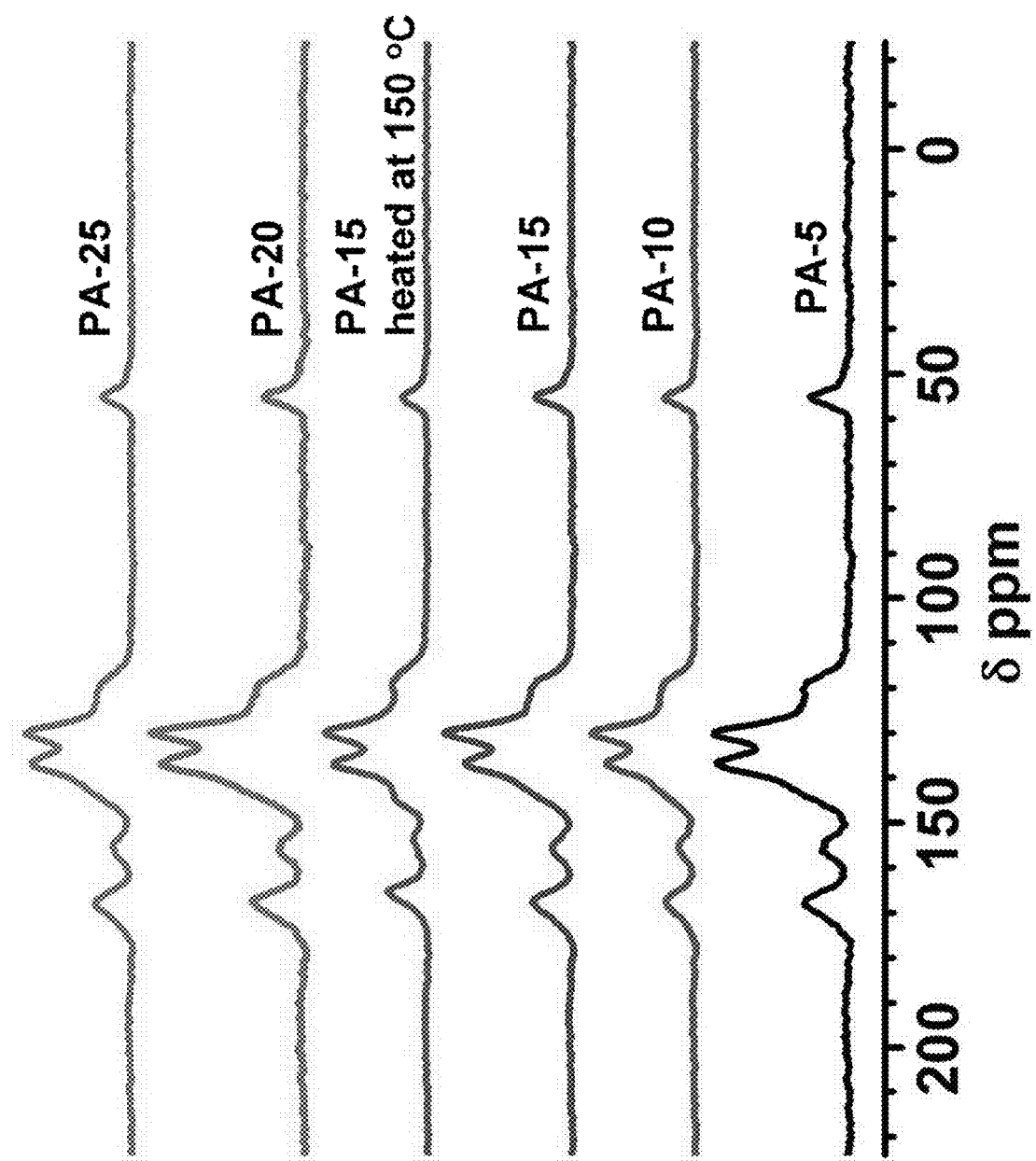
FIG. 5. Solid-state CPMAS $^{13}C$ NMR spectra of all PA-xx as shown.
Figure 6:
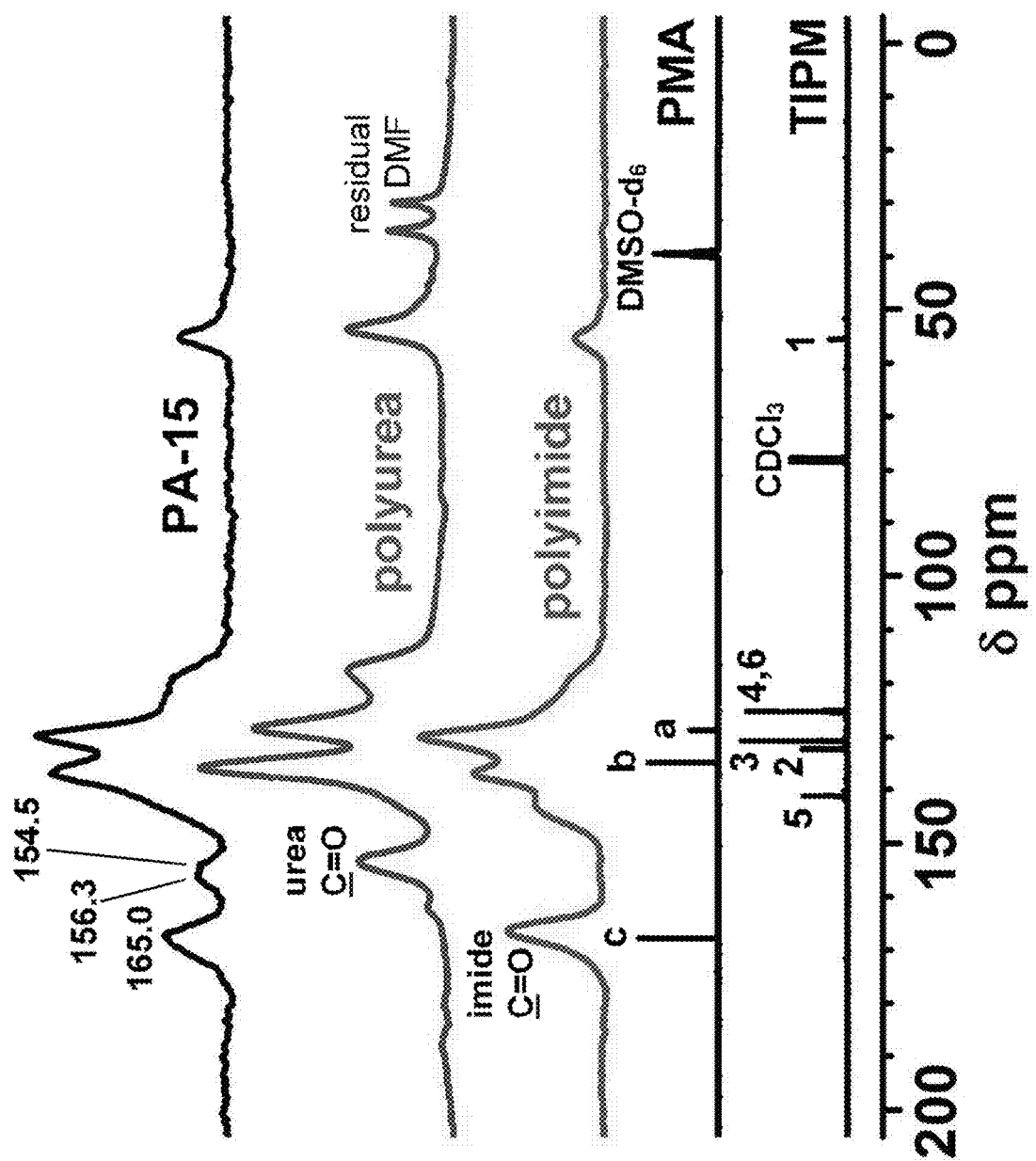
FIG. 6. Top three spectra: Solid-state CPMAS $^{13}C$ NMR spectra of a representative PA-xx aerogel, of a TIPM/$H_2O$-derived polyurea aerogel, and of a TIPM/pyromellitic anhydride-derived polyimide aerogel, as indicated. (Note, only polyurea contained residual gelation solvent: DMF). Bottom two spectra: Liquid state $^{13}C$ NMR of pyromellitic acid (PMA) in DMSO-$d_6$, and of TIPM in CDCl$_3$. (All spectra are referenced to TMS).
Figure 7:
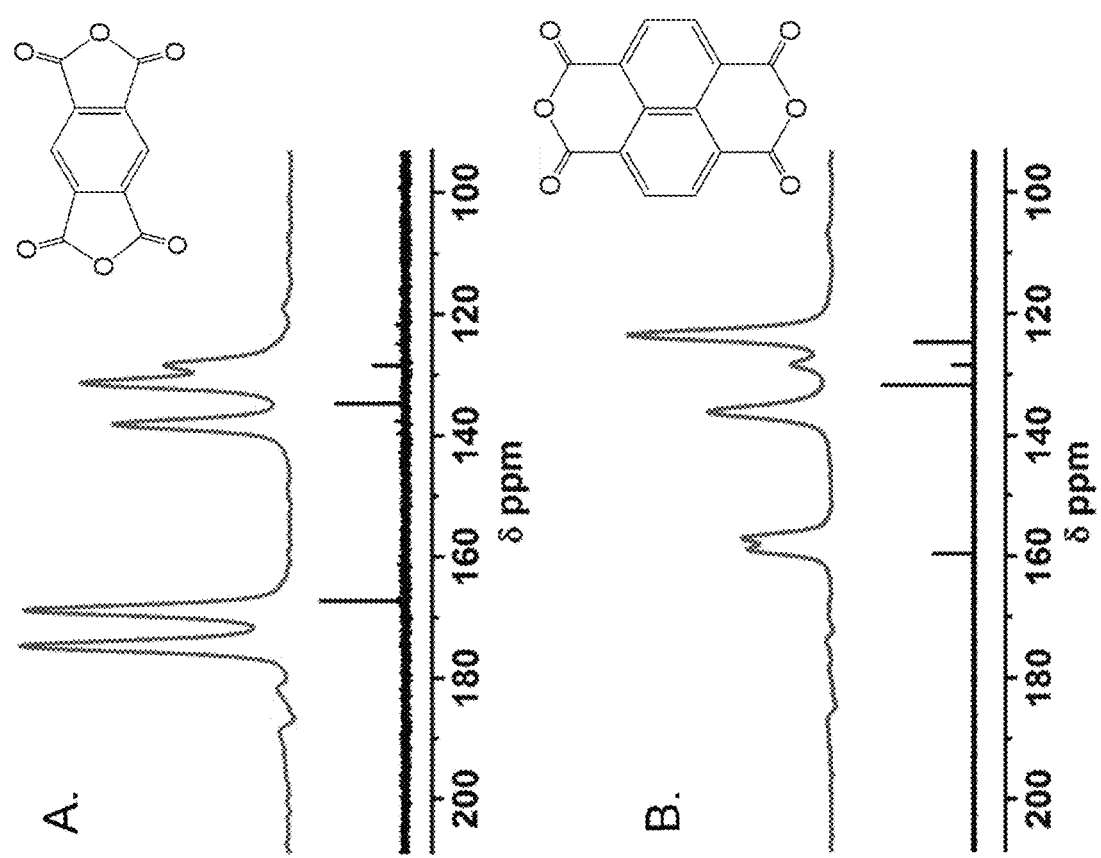
FIG. 7. Comparison of liquid phase (in DMSO-$d_6$) and solid-state CPMAS $^{13}C$ NMR spectra of pyromellitic dianhydride (A) and naphthalene tetracboxylic dianhydride (B), as shown.
Figure 8:
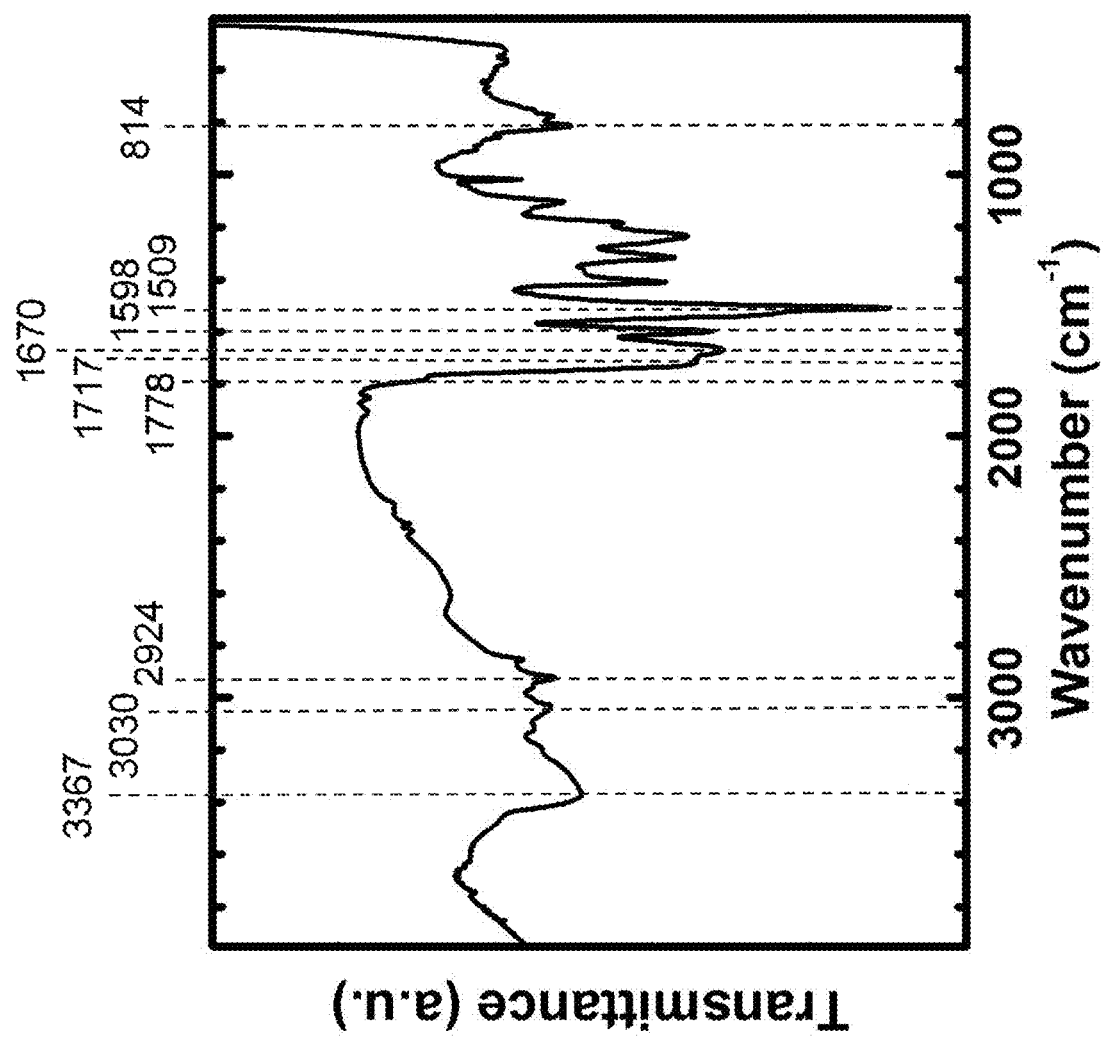
FIG. 8. FTIR spectrum of a representative as-prepared PA-xx aerogel (PA-15). Peak Assignment: 3367 cm$^{-1}$: NH stretch; 3030 cm$^{-1}$: aromatic C—H stretch; 2924 cm$^{-1}$: aliphatic C—H stretch; 1717 cm$^{-1}$ and 1778 cm$^{-1}$ (shoulder): symmetric and asymmetric stretches of imide C=O; 1670 cm$^{-1}$: overlapping urea, amide, and carbamic-anhydride C=O stretches; 1598 cm$^{-1}$, 1509 cm$^{-1}$: aromatic C=C stretches; 814 cm$^{-1}$: aromatic CH OOP bending (para substituted ring).

Characterization of polymeric aerogels (cont.): The chemical make-up of PA-xx. The chemical makeup of PA-xx was probed mainly with solid-state CPMAS $^{13}C$ and $^{15}N$ NMR. All solid-state $^{13}C$ NMR spectra of PA-xx are shown in FIG. 5, and are identical to one another. Thus, for example, a representative spectrum of PA-15 is shown in FIG. 6 along with: (a) the liquid $^{13}C$ NMR spectra of the monomers; (b) the spectrum of TIPM/$H_2O$-derived polyurea aerogels (see, Leventis, N., et al., *Chem. Mater.* 2010, 22:6692-6710); and, (c) the spectrum of TIPM/pyromellitic anhydride-derived polyimide aerogels (see, Chidambareswarapattar, C., et al., *RSC Adv.* 2013, 3:26459-26469). At first glance, the solid-state $^{13}C$ NMR spectra of PA-xx may seem deceptively simple: they combined the prominent aliphatic and aromatic $^{13}C$-resonances of TIPM and PMA, leaving the extra peak at 165.0 ppm to be assigned to the amide carbonyl (see Scheme 1). In comparison with the spectrum of TIPM/$H_2O$-derived polyurea, the lower-intensity resonance at around 155 ppm could be assigned to a urea carbonyl. Upon closer examination, however, the resonance at 155 ppm had actually two maxima, at 156.3 ppm and at 154.5 ppm, and that observation was consistent throughout all PA-xx, as discussed further below. The initial reaction product of an isocyanate with a carboxylic acid is a carbamic-anhydride adduct (Scheme 2, Eq 1) (see, Sorensen, W. R., *J. Org. Chem.* 1959, 24:978-980). That adduct either undergoes unimolecular rearrangement to an amide with loss of $CO_2$ (Scheme 2, Eq 2), or disproportionates with another molecule of the same kind towards urea and anhydride. The latter two products may react further with one another (reaction not shown) to yield 2 mol of the same amide that is obtained through the unimolecular route of Scheme 2, Eq 2. Without being bound by theory, it is unlikely, however, that polyurea here was the leftover of that bimolecular route. If it were, it should have been accompanied by an equivalent amount of anhydride. In that context, although the peak at 165.0 ppm could indeed include the $^{13}C$=O resonance of an anhydride, two facts corroborate against this hypothesis: (a) in solid-state NMR, it is known that the anhydride $^{13}C$=O appears as a pair of resonances (see, for example, FIG. 7), which are not observed in any of the spectra of PA-xx, and (b) the IR spectrum of PA-xx (see FIG. 8) does not show the characteristic pair of the symmetric and asymmetric stretches of an anhydride in the ranges of 1800-1830 $cm^{-1}$ and 1740-1775 $cm^{-1}$, respectively. Therefore, formation of polyurea should have been balanced out by something else, other than an anhydride, whose carbonyl resonance had to be included in the 165.0 ppm peak. As shown in FIG. 6, one such possibility is TIPM/pyromellitic anhydride-derived polyimide. In IR (FIG. 8), PA-xx does show the imide carbonyl absorptions at 1778 $cm^{-1}$(w) and 1717 $cm^{-1}$(s). In order to get a better idea about the number and identity of the N-based polymers in PA-xx, mechanistic reasoning was combined with solid-state $^{15}N$ NMR data.

SCHEME 2

Part A: Primary reaction step and primary products from the immediate intermediate (a carbamic-anhydride adduct)

Primary Reaction Step of TIPM and PMA (1)

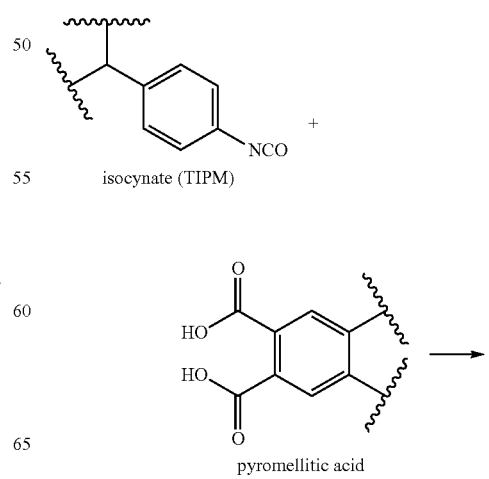

isocynate (TIPM)

pyromellitic acid

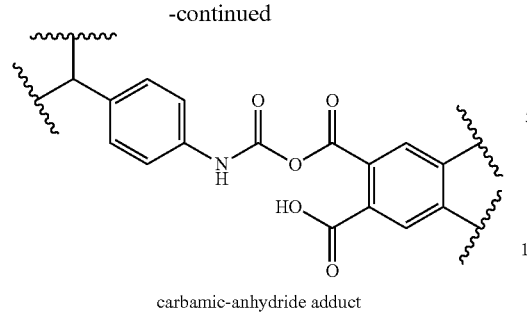
carbamic-anhydride adduct
Formation of Polyamide
(2)
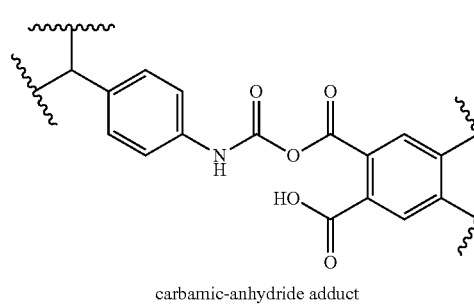
carbamic-anhydride adduct
polyamide
Formation of Amine and Anhydride
(3)
carbamic-anhydride adduct
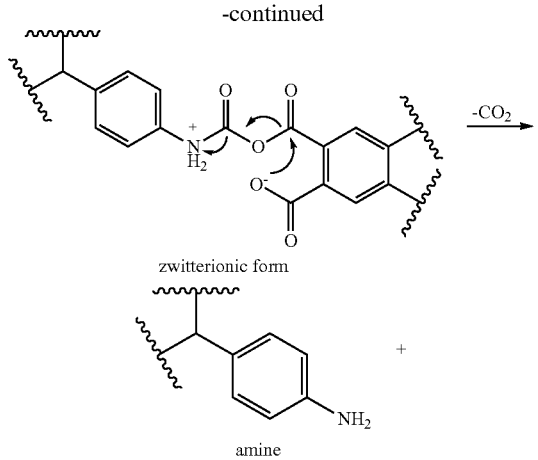
zwitterionic form
amine
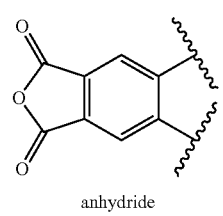
anhydride
Part B: Secondary reaction steps, and products from secondary intermediates
Formation of Polyurea
(4)
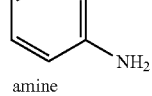
amine
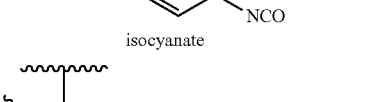
isocyanate
polyurea
Formation of Polyimide
(5)
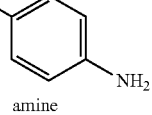
amine

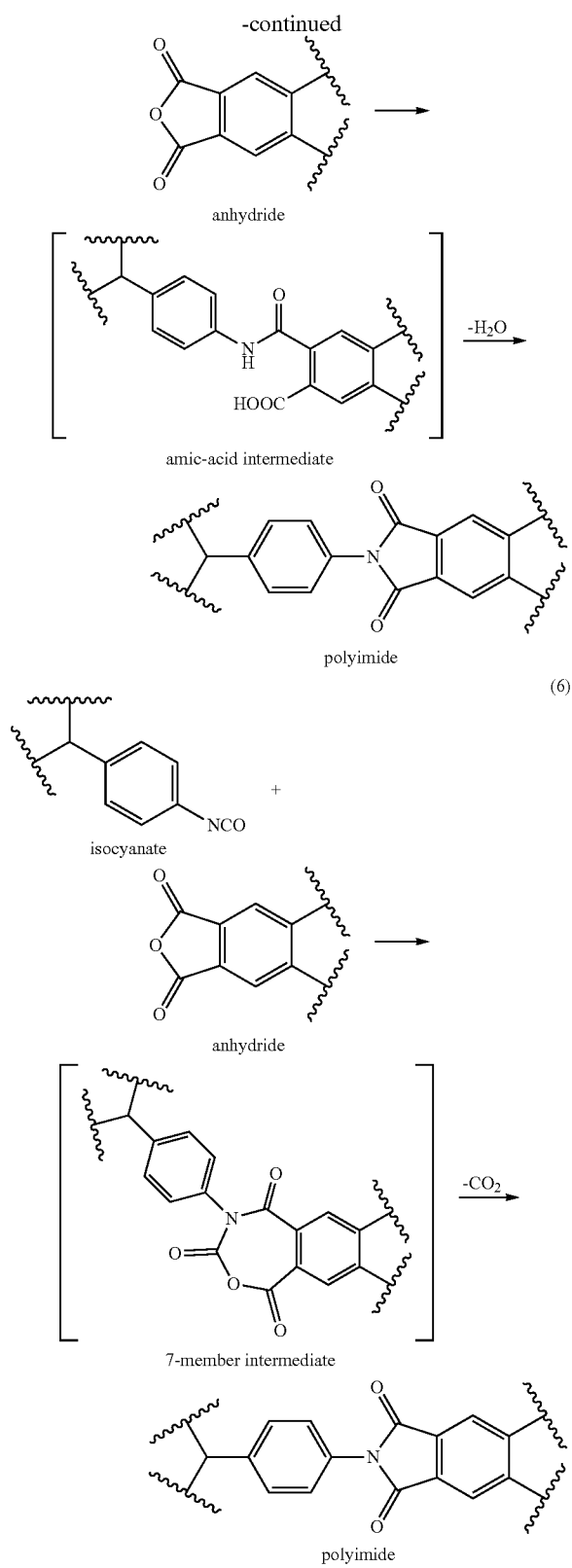

(6)

Figure 9:
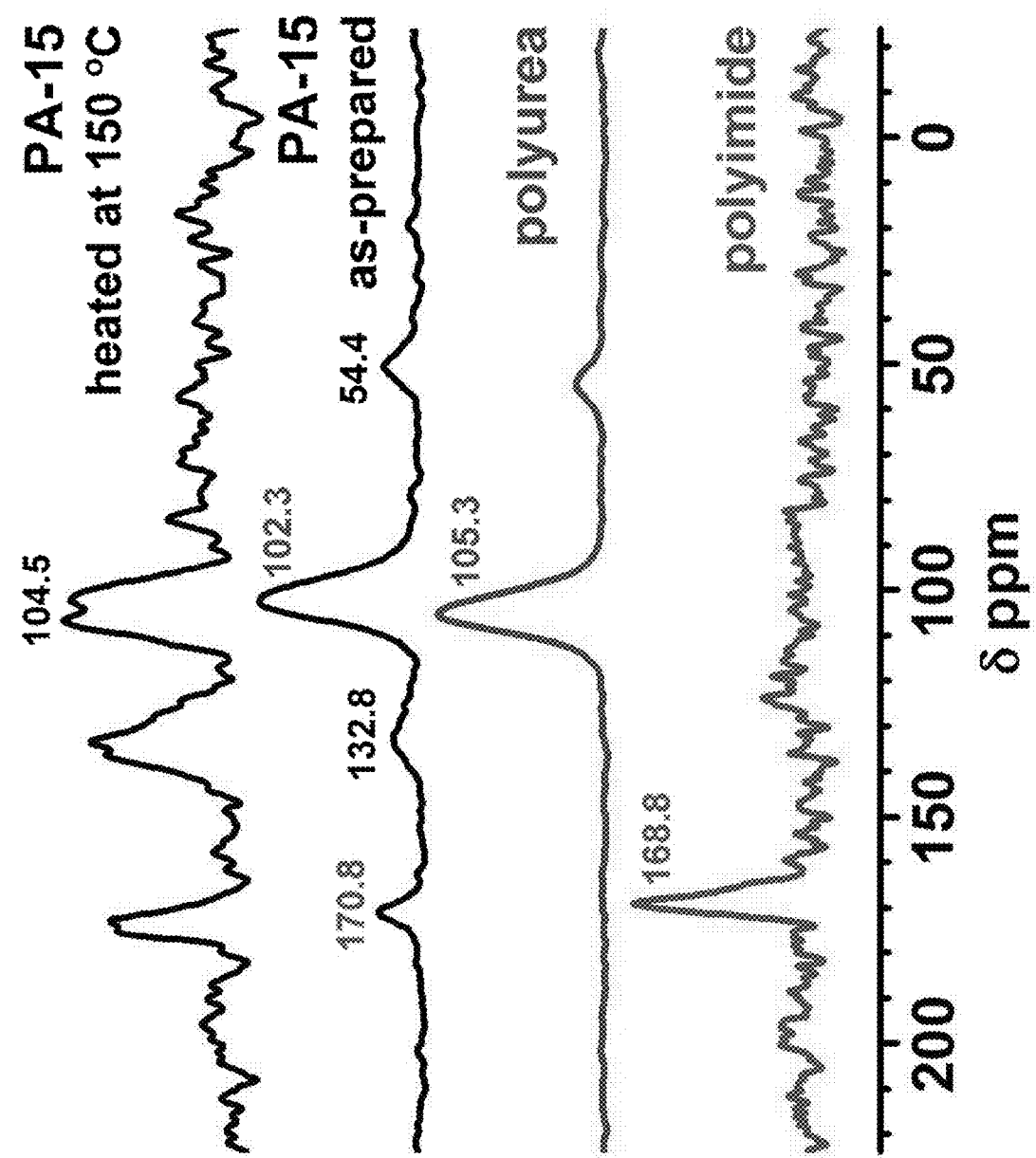
FIG. 9. Solid-state CPMAS $^{15}$N NMR spectra of a representative as-prepared PA-xx aerogel and after heating at 150° C., together with the spectra of a TIPM/H$_2$O-derived polyurea aerogel, and of a TIPM/pyromellitic anhydride-derived polyimide aerogel, as indicated. (All spectra are referenced to liquid NH$_3$).

In solid-state $^{15}$N NMR (FIG. 9) the peak at 102.3 ppm is near the resonance of TIPM/H$_2$O-derived polyurea at 105.3 ppm. The peak at 170.8 ppm was assigned to polyimide derived from TIPM/pyromellitic dianhydride (included in FIG. 9), which by itself gave a resonance at 168.8 ppm. The resonance at 132.8 ppm was assigned to polyamide and the remaining resonance at 54.4 ppm was assigned to dangling free aromatic amines. Without being bound by theory, a proposed mechanistic scheme accounting for: (a) polyimide as a main product; and, (b) formation of polyurea without parallel formation of an equivalent amount of anhydride, is based on the following: (a) formation of pyromellitic anhydride from pyromellitic acid is stereochemically favorable; and, (b) pyromellitic anhydride may in turn react towards polyimide either with TIPM itself, or with TIPM-derived free amines (both possibilities have literature precedents).

Specifically, it is speculated that the reaction sequence leading to urea and imide is initiated by an intramolecular acid-base neutralization within the carbamic-anhydride adduct toward its zwitterionic form, which in turn would then expel CO$_2$, and yield free aromatic amine and pyromellitic anhydride (Eq 3). Both of those products are known to be highly reactive towards —N═C═O. Thus, newly formed free dangling —NH$_2$ may react either with yet-unreacted isocyanate to give urea (Eq 4), or with newly formed anhydride to give imide (Eq 5). The latter reaction is known to proceed via an amic acid intermediate (see Eq 5) that, in a typical imide synthesis, requires a sacrificial dehydrating agent (usually acetic anhydride/pyridine). It is thus believed that the role of that dehydrating agent is played here by the isocyanate. As mentioned above, alternatively, polyimide may also be formed via reaction of anhydride groups with isocyanate via a 7-member intermediate that expels CO$_2$ (Eq 6).

Figure 10:
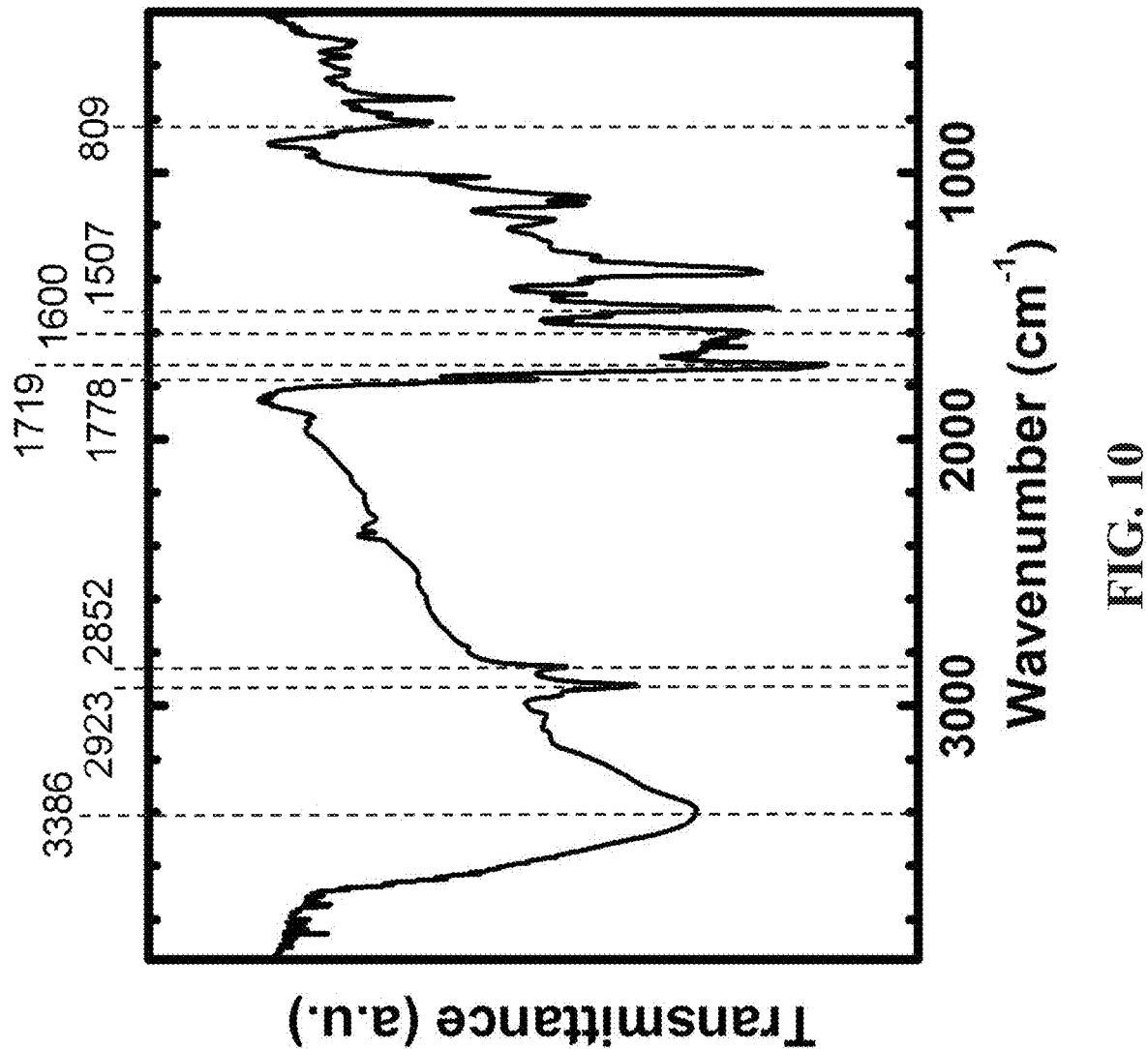
FIG. 10. FTIR of PA-15 aerogel after heating at 150° C. In comparison with the previous spectrum, note the sharpening of the imide absorptions at 1778 cm$^{-1}$ and 1719 cm$^{-1}$, and the absence of the broad absorption at 1670 cm$^{-1}$.

The obtained data may be taken as showing that PA-xx are mixtures of three main components: polyamide, polyimide and polyurea. The fact that the $^{15}$N NMR resonances of polyimide and polyurea in PA-xx were near, but not exactly at the resonances of the homopolymers synthesized independently, may be taken as evidence that PA-xx was a random copolymer of the three components rather than a polymer blend. Furthermore, although $^{15}$N NMR data may not be exactly quantitative, it is noticeable that the resonance at 102.3 ppm was disproportionally intense. Along those lines, heating of any as-prepared PA-xx sample to 150° C.: (a) liberates CO$_2$ (the chemical identity of the evolving gas was confirmed with mass spectrometry); (b) decreases the intensity of the $^{15}$N NMR resonance at 102.3 ppm and moves it closer to the resonance of polyurea (new position at 104.5 ppm vs. 105.3 ppm for the homopolymer); and, (c) increases the relative intensity of the amide resonance. (The post-heating $^{15}$N NMR spectrum of PA-xx is included in FIG. 9). More subtle but similar are changes observed in the $^{13}$C NMR spectra of PA-xx upon heating (FIG. 5). For example, after heating PA-15 at 150° C., the feature at 156/154 ppm turned into a single-maximum resonance at 153.6 ppm, and the integrated carbonyl peak area ratio changed in favor of the resonance at 165.0 ppm: from (7.4±0.3): (2.6±0.3) in all PA-xx before heating, to, for example, 8.3:1.7 for PA-15 after heating. Therefore, the $^{13}$C NMR feature at 156/154 ppm included again two components, only one of which was polyurea; the second one was convertible to polyamide, whose resonance was under the peak at 165.0 ppm. Finally, after heating at 150° C., the carbonyl region of the IR spectrum of PA-xx was simplified significantly: the strongest, broad absorption at 1670 cm$^{-1}$ was removed and the imide absorptions at 1778 cm$^{-1}$ and 1719 cm$^{-1}$ became sharper (see FIG. 10). All heating experiments (including spectroscopic evidence and evolution of CO$_2$) support the notion that PA-xx comprised a fourth component: unreacted carbamic-anhydride moieties (Eq 1).

This may be deemed important in terms of interpreting the evolution of the porous structure upon pyrolysis.

Example 5

Figure 11:
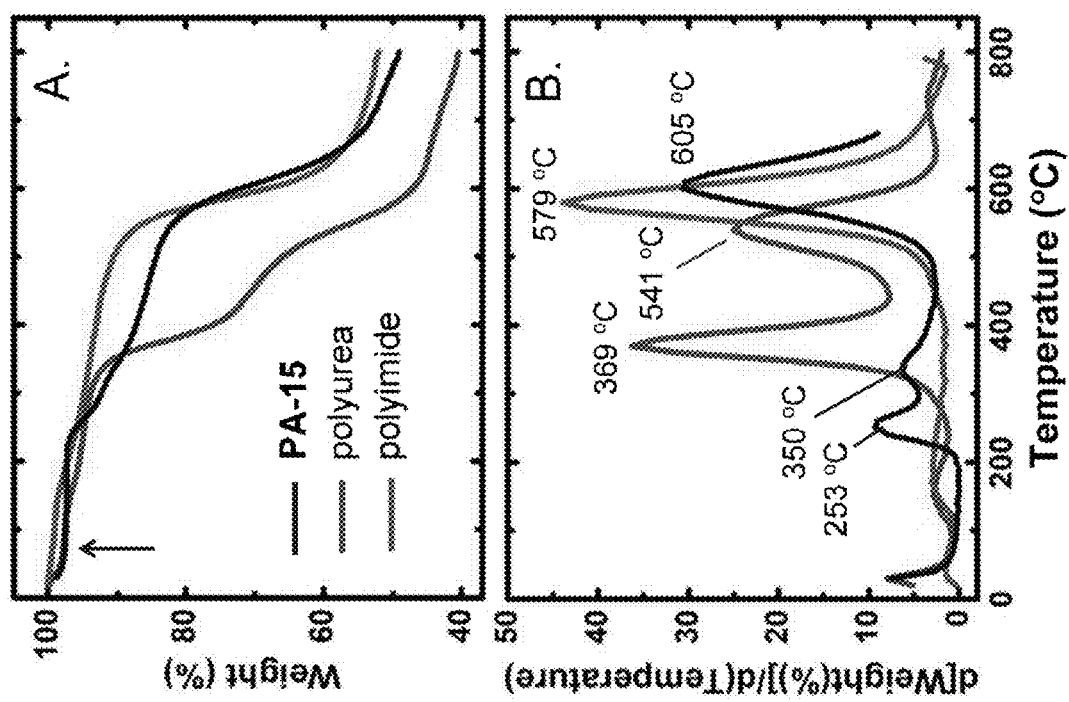
FIG. 11. (A) Representative thermogravimetric analysis data (TGA) under N$_2$ at 5° C. min' of samples as shown. (Arrow points at the early mass loss by PA-15 (about 3%), which is due to loss of CO$_2$). (B) First derivative of the traces in part (A).

Pyrolysis of PA-xx aerogels to carbons and reactive etching with $CO_2$. Preparation of C-xx and EC-xx carbon aerogels. FIG. 11 compares the thermogravimetric analysis (TGA) data of PA-xx, and the two controls: TIPM/$H_2O$-derived polyurea (see, Leventis, N.; et al., *Chem. Mater.* 2010, 22:6692-6710.), and TIPM/pyromellitic anhydride-derived polyimide (see, Chidambareswarapattar, C.; et al., *RSC Adv.* 2013, 3:26459-26469.). The low-temperature (<100° C.) mass loss in polyurea may be attributed to loss of residual solvent (see $^{13}C$ NMR). According to solid-state $^{13}C$ NMR again, PA-xx were free of residual solvent; thus, the early mass loss of about 3% was due to loss of $CO_2$ from the carbamic-anhydride adduct (Scheme 2, Eq 2). At higher temperatures, PA-xx showed three main degradation events: one at 605° C., which, in fact, was higher than the highest decomposition events of both the polyurea (541° C.), and the polyimide (579° C.) components (note: the higher top decomposition event (by about 25° C.) of PA-xx relative to the polyimide homopolymer sample serving as a control is attributed to the lower strain energy stored in PA-xx relative to the less flexible polyimide); a second degradation event at 350° C., which was close to the first decomposition step of the polyurea component (369° C.); and, a third event at 253° C., which was attributed to the polyamide component (note: a similar lower-temperature degradation event, at about 310° C., was reported recently for polyamide aerogels derived from TIPM and ferrocene dicarboxylic acid; see, Saeed, A. M.; et al., *Chem. Mater.* 2016, 28:4867-4877). In practice, PA-xx were carbonized at 800° C. under Ar (i.e., at about 200° C. higher than the highest degradation step in TGA) to materials referred to as C-xx. C-xx were etched with $CO_2$ at 1,000° C. to materials referred to as EC-xx (FIG. 0.1).

Example 6

Chemical composition of C-xx and EC-xx aerogels. The carbonization yield of PA-xx to C-xx varied in the range of 42-57% w/w. Reactive etching removed less mass than carbonization: yields from C-xx to EC-xx were in the range of 65-78% w/w. CHN analysis of middle-density PA-15 gave (% w/w): C, 62.91; H, 4.40, and N, 7.93. After pyrolysis, C-15 consisted of: C, 85.95%, H, 1.54%; N, 5.44%. After etching, EC-15 consisted of: C, 80.92%, H, 1.18%; N, 5.61%. Considering those CHN analysis data together with the particular carbonization yield of PA-15 (47.82±0.63%), and the etching yield of C-15 (75.11±2.22%), it was calculated that C-15 retained (w/w) 65% of the C, and 33% of the N in the parent PA-15. By the same token, EC-15 retained (w/w) 71% of the C, and 77% of the N present in C-15. Overall, EC-15 retained 25% w/w of the N initially present in PA-15.

Figure 12:
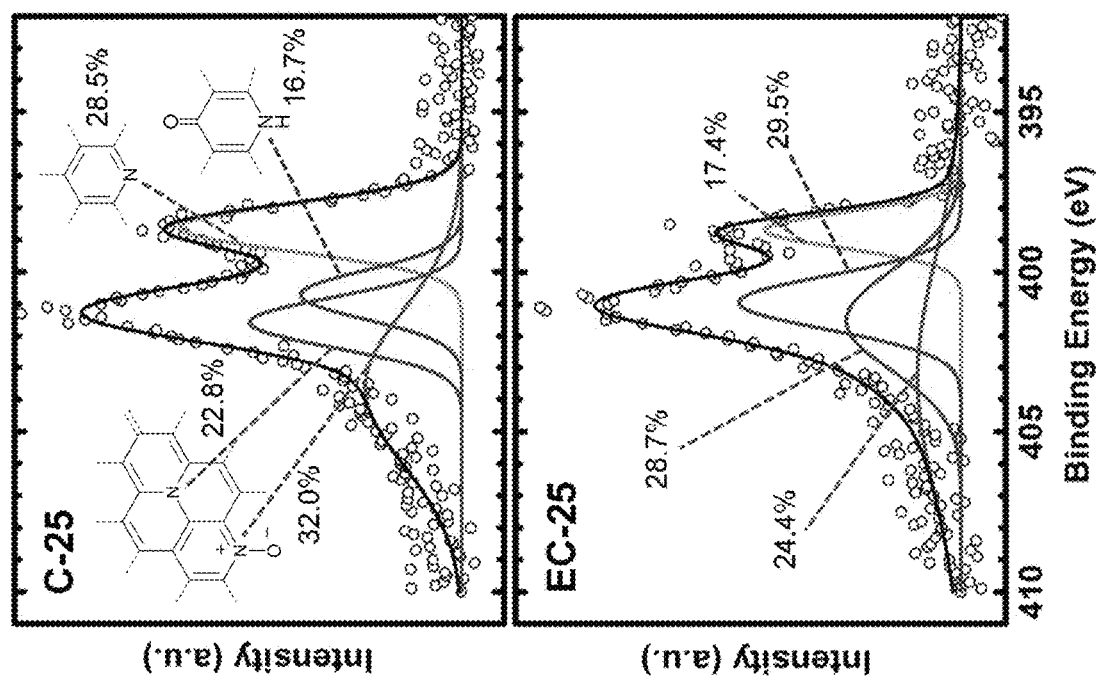
FIG. 12. High resolution XPS spectra (circles) of the N1s peak in the two samples as shown. Data were fitted with Gaussians that correspond to the types of N as indicated. (For C-25, $R^2$=0.969; for EC-25, $R^2$=0.959).
Figure 13:
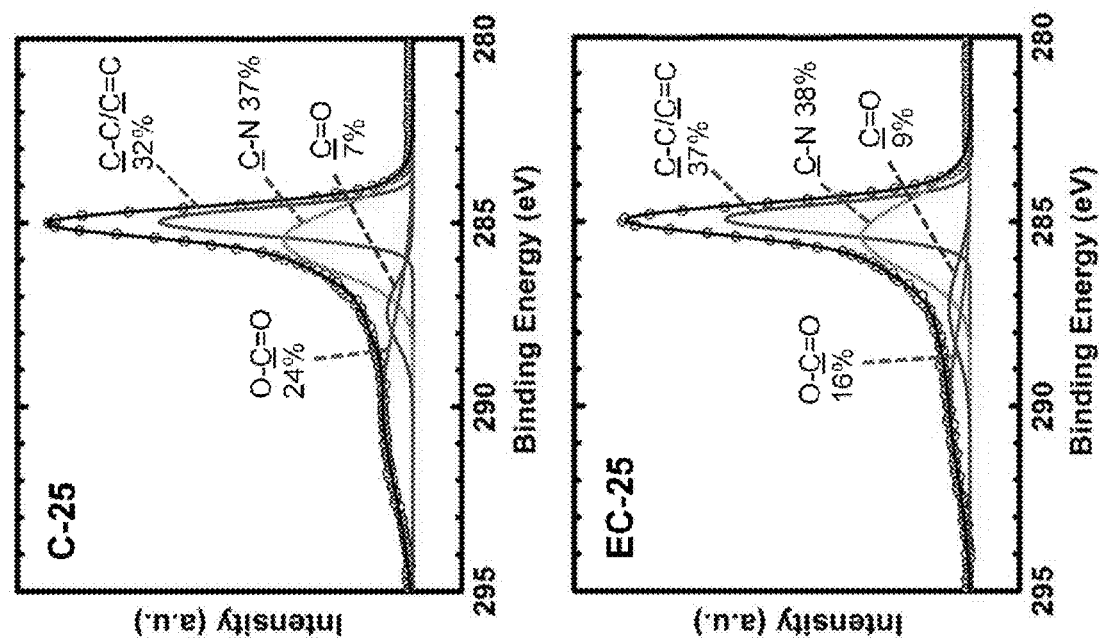
FIG. 13. High resolution XPS data (circles) of the C1s peak in the two samples as shown. Both spectra were fitted with 4 Gaussians as shown. (For both C-25 and EC-25, $R^2$=0.998).

Because of the potential importance of N for sequestration of $CO_2$ (see, Wang, M.; et al., *RSC Adv.* 2014, 4:61456-61464; and, Zhong, M.; et al., *J. Am. Chem. Soc.* 2012, 134:14846-14857), the chemical environment of N in C-xx and EC-xx was probed with XPS. The high-resolution spectra of the N1s peak in C-25 and EC-25 are shown in FIG. 12. Both spectra were fitted with four Gaussians. In C-25 those curves were centered at 398.62 eV (pyridinic N, 28.49%), at 400.71 eV (pyridonic N, 16.68%), at 401.57 (quaternary N, 22.87%), and at 403.62 eV (pyridine oxide, 31.96%) (note: peak assignments according to: Pels, J. R., et al., *Carbon* 1995, 33:1641-1653, and references therein). After etching, those curves were centered at 398.68 eV (pyridinic N, 17.41%), at 400.95 eV (pyridonic N, 29.50%), at 401.51 eV (quaternary N, 28.66%), and at 403.30 eV (pyridine oxide, 24.43%). (Those assignments are supported by corresponding findings about carbon located at C=O and C—N positions; see FIG. 13). Overall, XPS shows that a significant portion of the retained N was situated in pyridinic and pyridonic positions that, acting as nucleophiles, were most likely to interact with $CO_2$. Notably then, although the total pyridinic+pyridonic N in C-25 and EC-25 was comparable (45.17% vs. 46.91%), the balance had been shifted from pyridinic in C-25 (ratio=1.71) to pyridonic (ratio=0.59) in EC-25.

Example 7

Figure 4:
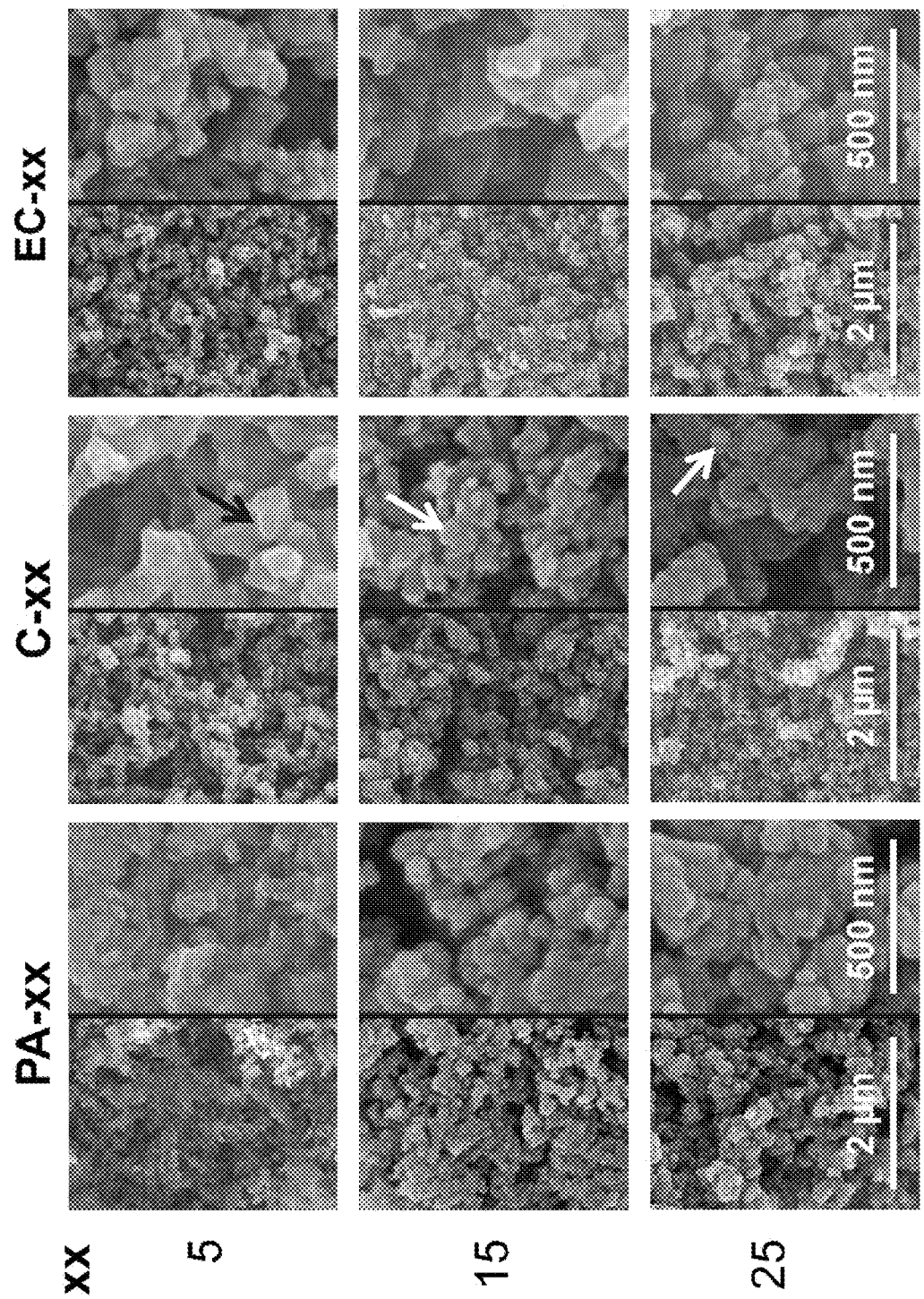
FIG. 4. Scanning Electron Microscopy (SEM) at two different magnifications of low (xx=5), middle (xx=15) and high (xx=25) density PA-xx aerogels, the corresponding carbon aerogels (C-xx) and the etched carbon aerogels (EC-xx). Arrows point at particles matching the primary particle sizes as those were identified with SAXS (see Table 4, and FIG. 3).

General material properties and the nanostructure of C-xx and EC-xx aerogels. Microscopically, C-xx and EC-xx looked similar to one another (FIG. 4). In comparison with PA-xx it seems that pyrolysis brought about a fusion of particles and made macropores wider. In SAXS (FIG. 3), the primary particle radii of C-xx were in the 31-38 nm range, which, accounting for pyrolytic shrinkage (see below), corresponds roughly to the secondary particle radii in PA-xx (found in the 44-55 nm range; see Table 2). SEM particles matching the SAXS primary particle radii of C-xx are indicated with arrows (FIG. 4).

According to the photographs of FIG. 1, C-xx shrunk significantly relative to PA-xx, but did much less so upon etching. Following the same pattern with the parent PA-xx, shrinkage of both C-xx and EC-xx decreased as xx increased. (For shrinkage and other relevant material characterization data for C-xx and EC-xx see Table 4). Again, following the pattern of PA-xx, bulk densities of C-xx increased monotonically with xx. However, bulk densities of EC-xx decreased as xx increased. For instance, for EC-5 $\rho_b$=0.919±0.037 g cm$^{-3}$, for EC-10 $\rho_b$=0.284±0.011 g cm$^{-3}$ and for EC-25 $\rho_b$=0.247±0.001 g cm$^{-3}$ (Table 4). That trend could not be attributed entirely to the lower shrinkage at higher xx. As discussed earlier, the polymeric layer accumulating on top of the primary nanoparticle network via the monomer-to-network growth mechanism included free-volume porosity, and its density was lower than that of the primary network. It is reasonable then that the secondary layer of polymer leads to somewhat less dense, more reactive carbon, which was etched faster than carbon from the core network. The thicker that layer, the higher the mass loss, which, in combination with decreasing shrinkage at higher xx values, justifies the downward trend in the bulk densities of EC-xx. This interpretation is supported by skeletal density data: as shown in Table 4, the $\rho_s$ values of C-xx decreased monotonically with xx, from 2.033±0.021 g cm$^{-3}$ (C-5) to 1.870±0.025 g cm$^{-3}$ (C-25), while skeletal densities of EC-xx did exactly the opposite: they increased from 1.763±0.235 g cm$^{-3}$ (EC-5) to 2.246±0.034 g cm$^{-3}$ (EC-25). The downward trend in the $\rho_s$ values of C-xx implies that those samples included closed porosity. The inverse trend in EC-xx supports that: (a) reactive etching opened access to the closed pores of C-xx (i.e., rendered open pores closed); and, (b) carbon from the primary skeletal network was more dense.

TABLE 4

Characterization of carbon (C-xx) and etched-carbon (EC-xx) aerogels.

| xx | linear shrinkage (%) [a,b] | bulk density $\rho_b$ (g cm$^{-1}$) [a] | skeletal density, $\rho_s$ (g cm$^{-3}$) [c] | Π (% v/v) [d] | specific pore volume (cm$^1$ g$^{-1}$) | | $V_{micropre}$ [g] | |
|---|---|---|---|---|---|---|---|---|
| | | | | | $V_{Total}$ [e] | $V_{1.7-300\_nm}$ [f] | $N_2$ | $CO_2$ |
| Carbon Aerogels (C-xx) |
| 5 | 63.71 ± 0.28 | 0.322 ± 0.025 | 2.033 ± 0.021 | 84 | 2.614 | 0.090 | 0.130 | 0.134 |
| 10 | 54.92 ± 0.26 | 0.367 ± 0.006 | 2.030 ± 0.019 | 82 | 2.232 | 0.078 | 0.102 | 0.122 |
| 15 | 47.82 ± 0.63 | 0.404 ± 0.018 | 1.956 ± 0.017 | 79 | 1.964 | 0.070 | 0.155 | 0.125 |
| 20 | 43.93 ± 0.10 | 0.422 ± 0.008 | 1.954 ± 0.021 | 78 | 1.858 | 0.056 | 0.192 | 0.119 |
| 25 | 39.80 ± 0.28 | 0.451 ± 0.013 | 1.870 ± 0.025 | 76 | 1.683 | 0.068 | 0.255 | 0.126 |
| Etched Carbon Aerogels (EC-xx) |
| 5 | 83.60 ± 0.16 | 0.919 ± 0.037 | 1.763 ± 0.235 | 48 | 0.521 | 0.010 | 0.408 | 0.191 |
| 10 | 60.69 ± 0.36 | 0.284 ± 0.011 | 2.143 ± 0.126 | 87 | 3.054 | 0.127 | 0.414 | 0.189 |
| 15 | 59.81 ± 0.27 | 0.279 ± 0.007 | 2.169 ± 0.090 | 87 | 3.123 | 0.123 | 0.454 | 0.191 |
| 20 | 52.43 ± 0.23 | 0.255 ± 0.006 | 2.325 ± 0.123 | 89 | 3.491 | 0.120 | 0.439 | 0.190 |
| 25 | 45.12 ± 0.19 | 0.247 ± 0.001 | 2.246 ± 0.034 | 89 | 3.603 | 0.101 | 0.371 | 0.190 |

| xx | BET surface area, σ (m$^2$ g$^{-1}$) [h] | average pore diameter (nm) | | micropore width (nm) [k] | | particle radius (nm) r [l] |
|---|---|---|---|---|---|---|
| | | 4V/σ [i] method | BJH [j] method | cylindrical | slit | |
| Carbon Aerogels (C-xx) |
| 5 | 429 (337) | 24 [2.7] | 29 [—] | 0.583 | 0.347 | 3.44 |
| 10 | 380 (291) | 24 [2.8] | 28 [17] | 0.608 | 0.365 | 3.89 |
| 15 | 353 (270) | 22 [2.8] | 32 [21] | 0.577 | 0.342 | 4.34 |
| 20 | 365 (301) | 20 [2.7] | 35 [24] | 0.708 | 0.426 | 4.21 |
| 25 | 302 (230) | 22 [3.0] | 36 [26] | 0.669 | 0.403 | 5.31 |
| Etched Carbon Aerogels (EC-xx) |
| 5 | 793 (741) | 2.6 [2.1] | 22 [13] | 0.703 | 0.423 | 2.15 |
| 10 | 1561 (1148) | 7.8 [2.3] | 27 [11] | 0.698 | 0.420 | 0.90 |
| 15 | 1556 (1130) | 8.0 [2.3] | 26 [9] | 0.689 | 0.415 | 0.89 |
| 20 | 1742 (1140) | 8.0 [2.3] | 28 [10] | 0.654 | 0.394 | 0.74 |
| 25 | 1394 (1122) | 10 [2.8] | 33 [11] | 0.636 | 0.383 | 0.96 |

[a] Average of 3 samples.
[b] Linear shrinkage = 100 × (mold diameter − sample diameter)/(mold diameter).
[c] Single sample, average of 50 measurements.
[d] Porosity, $\Box$ = 100 × ($\rho_s$ − $\rho_b$)/$\rho_s$.
[e] Calculated via $V_{Total} = (1/\rho_b) - (1/\rho_s)$.
[f] Cumulative volume of pores between 1.7 nm and 300 nm from $N_2$-sorption data and the BJH desorption method.
[g] $V_{micropre}$ was calculated either with $N_2$-sorption using low-pressure dosing at 77 K, or with $CO_2$-sorption up to 760 torr (relative pressure of 0.03) at 273 K. (For comparison, t-plot micropore volumes derived from medium-pressure $N_2$-sorption data at 77 K were as follows (running down the respective columns): for C-xx: 0.173; 0.150; 0.139; 0.155; 0.118. For EC-xx: 0.389; 0.592; 0.583; 0.591; 0.578.)
[h] Numbers in (parentheses): micropore surface areas calculated via t-plot analysis using the Harkins and Jura model.
[i] For the first number, V was taken equal to $V_{Total} = (1/\rho_b) - (1/\rho_s)$; for the number in [brackets], V was set equal to the maximum volume of $N_2$ absorbed along the isotherm as P/Po→1.0.
[j] From the BJH plots: first numbers are peak maxima; numbers in (parentheses) are full widths at half maxima.
[k] By applying the Horvath-Kawazoe method on $N_2$-sorption data under low-pressure dosing (P/Po ≤ 0.1). First column, assuming cylindrical pores; second column, assuming slit pores.
[l] Particle radius, r = 3/($\rho_s$ × σ).

Example 8

Figure 14:
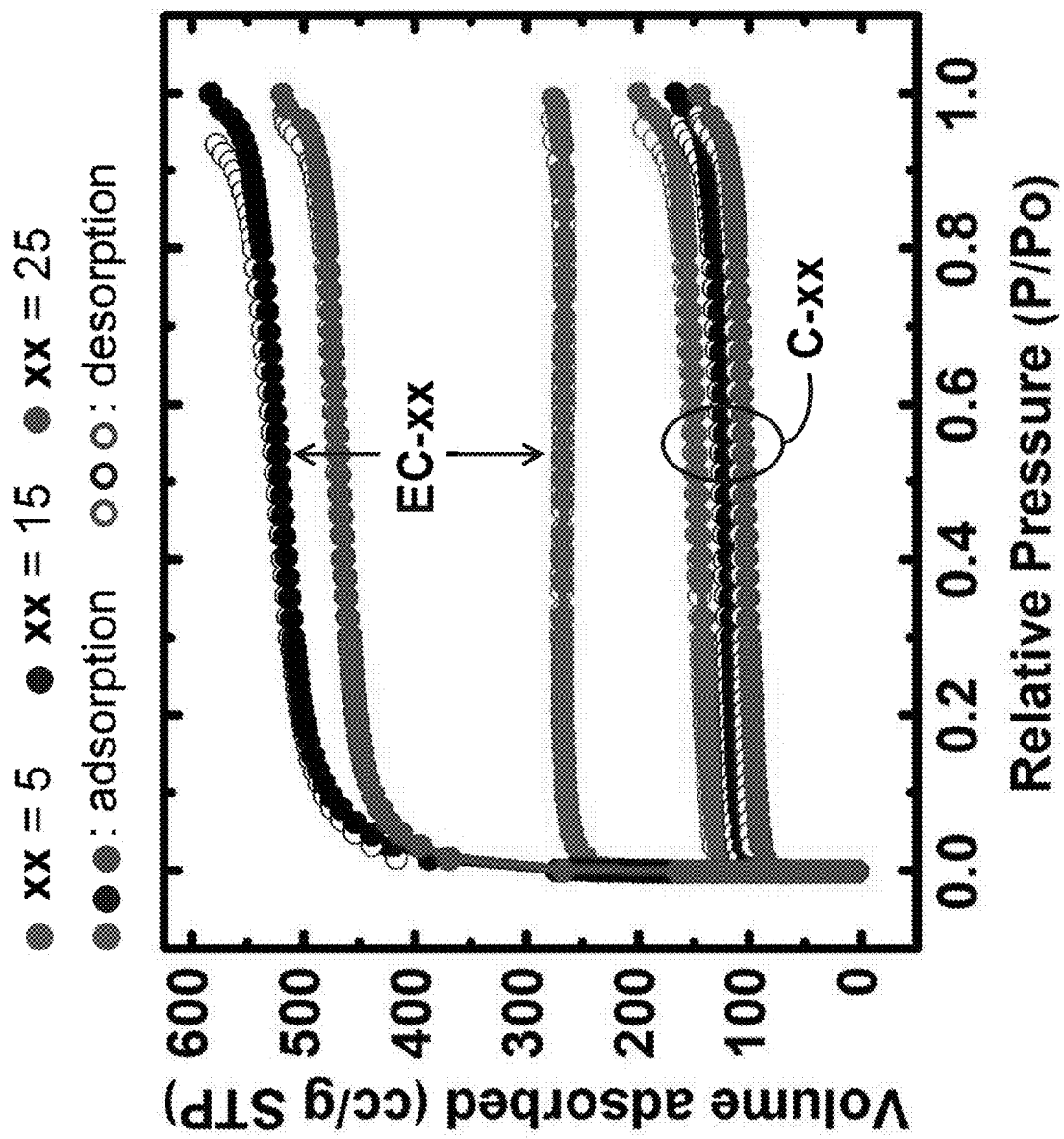
FIG. 14. N$_2$-sorption isotherms at 77 K of three C-xx and three EC-xx aerogels at the lowest (xx=5), middle (xx=15) and highest (xx=25) density levels, as indicated by color-coding. (Each isotherm combines data from two experiments, including one carried out with a low-pressure transducer to follow micropores).

The pore structure of C-xx and EC-xx aerogels. Overall, C-xx had pairwise about equal percent porosities to their parent PA-xx (compare data in Tables 2 and 4), descending from 84/89% v/v (C-5/PA-5) to 76/75% v/v (C-25/PA-25). That trend suggests that, closed pores notwithstanding, pyrolytic mass loss and shrinkage nearly compensated one another. On the other hand, with the exception of EC-5, which underwent excessive shrinkage (FIG. 0.1), the porosities of all other EC-xx remained high (87-89% v/v). Correspondingly, the total specific pore volume, $V_{Total}$, of C-xx decreased from 2.6 cm$^3$ g$^{-1}$ (C-5) to 1.7 cm$^3$ (C-25), while $V_{Total}$ of EC-xx jumped from 0.52 cm$^3$ g$^{-1}$ (EC-5) to 3.1 cm$^3$ g$^{-1}$ (EC-10), and kept on increasing slowly afterwards to 3.6 cm$^3$ g$^{-1}$ (EC-25) (Table 4). At first, pore structures were probed with $N_2$ sorption porosimetry at 77 K. The isotherms of both C-xx and EC-xx (FIG. 14) were very different from those of the parent PA-xx (FIG. 2): they were Type I/Type IV hybrids, dominated by an early sharp uptake of $N_2$ at low partial pressures (P/Po<0.01), followed by extended plateaus and small upwards inflections/hysteresis loops at P/Po>0.85. With the exception of EC-5, the plateau positions within each C-xx or EC-xx series of samples were almost independent of xx. Next, it is noted that the EC-xx plateaus were four- to five-fold higher than those of C-xx. Qualitatively, these data signify that the pore structure below 300 nm in both C-xx and EC-xx were dominated by micropores. The fact that isotherms within each one of the two types of materials, C-xx and EC-xx, were practically invariant of xx (always with the exception of EC-5) and clustered together suggests that generation of microporosity in PA-xx was mostly independent of the nano/microstructure, thereby an innate property of the material. According to this reasoning, microporosity most likely was created by the stepwise decomposition of the PA-xx components (identified in FIG. 11), starting from below 200° C. with liberation of $CO_2$ from the carbamic-anhydride adduct (to complete amide formation: Scheme 2, Eq 2). Without being bound by theory, it is speculated that the shape of the polymeric framework around the newly formed microcavities was preserved by the most (thermally) stable, and at the same time most rigid component of the copolymer, the imide. That process created both closed and open micropores (based on the $\rho_s$ data of C-xx, as discussed above), and the primary effect of reactive etching was to open access to the closed pores. A secondary effect of reactive etching, as discussed below, was to make micropores slightly wider.

The first profound effect of microporosity was on surface areas (Table 4). The BET surface area of C-xx was in the 300-400 m$^2$ g$^{-1}$ range (versus 50-170 m$^2$ g$^{-1}$ of the parent PA-xx; Table 2). A high portion of the surface area of C-xx (76-78% or 230-340 m$^2$ g$^{-1}$) was allocated (via t-plot analysis and the Harkins and Jura model) to micropores. After etching, the BET surface area of CE-xx (10≤xx<25) was catapulted into the 1400-1750 m$^2$ g$^{-1}$ range, with 65-80% of that area (1120-1150 m$^2$ g$^{-1}$) attributed to micropores.

A quantitative evaluation of the micropore volume was carried out by considering three independent sets of data: (a) the low-pressure $N_2$-sorption isotherms at 77 K (FIG. 14) according to the Horvath-Kawazoe model (data in Table 4) (Horváth, G., et al., *J. Chem. Eng. Jpn.* 1983, 16:470-475); (b) the medium-pressure $N_2$-sorption isotherms at 77 K using t-plot analysis (Harkins and Jura model; data in footnote g of Table 4); and, (c) $CO_2$ adsorption porosimetry up to 1 bar at 0° C. (isotherms in FIG. 15A, data in Table 4). Pore size distributions (PSD) within the micropore range were calculated from the $CO_2$ adsorption isotherms using a DFT model.

Figure 15:
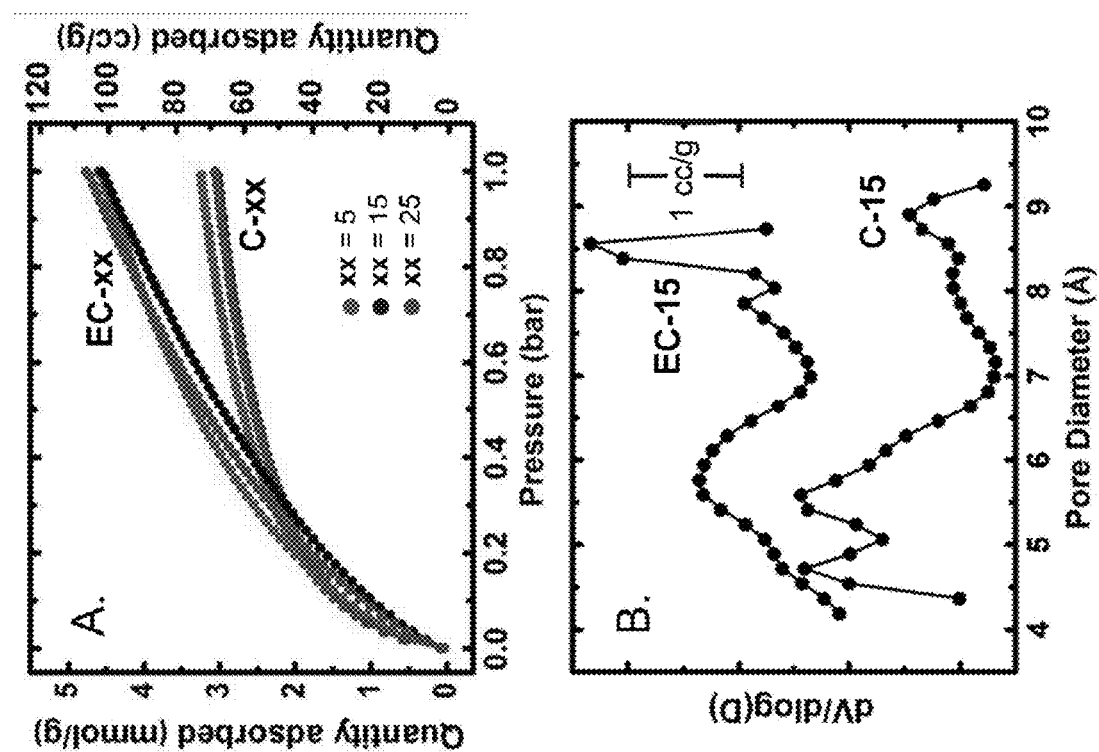
FIG. 15. A. CO$_2$ adsorption isotherms at 0° C. (273 K) up to 1 bar of the carbon aerogels samples, as shown. B. Pore size distribution calculated by the CO$_2$ adsorption data of part A.
Figure 16:
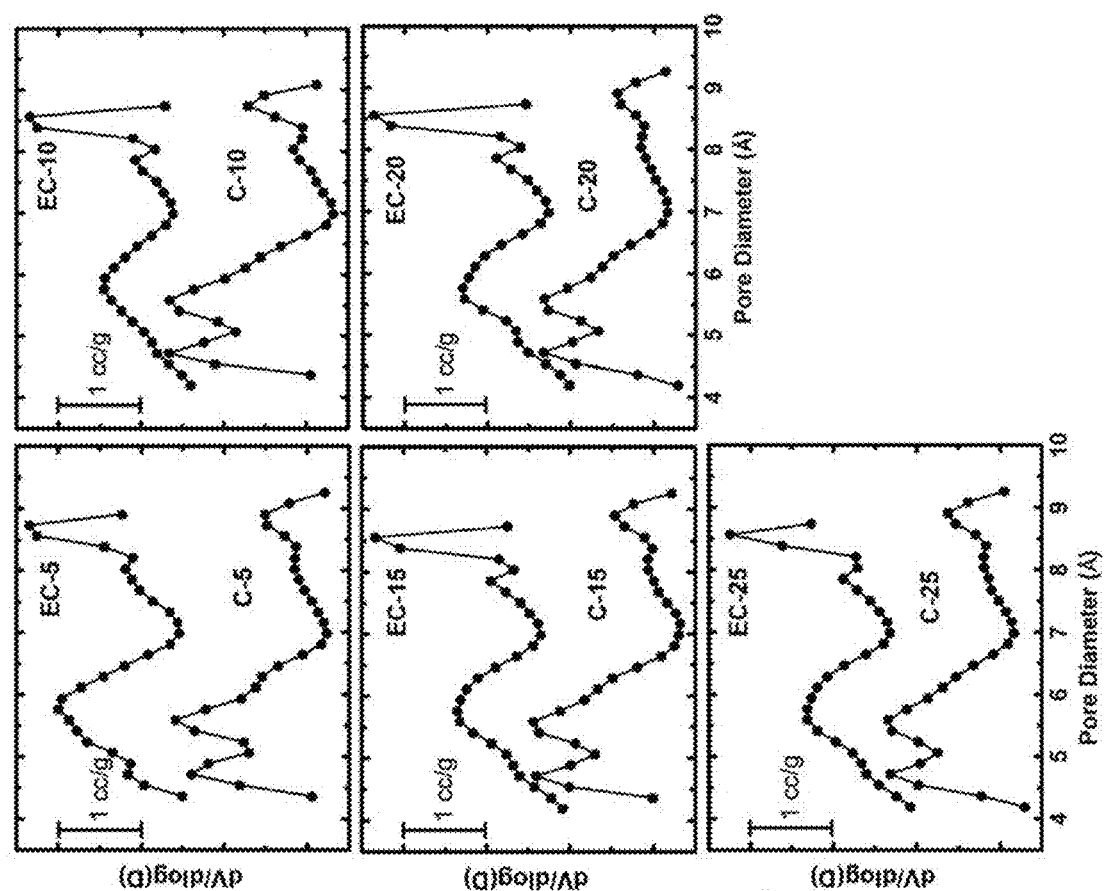
FIG. 16. Micropore size distribution of all C-xx and EC-xx. Pore size distributions in the micropore range of C-xx and EC-xx as shown. Data are based on CO$_2$ adsorption isotherms at 0° C., up to 1 bar absolute pressure (see FIG. 8) and were calculated using a DFT model.

Irrespective of the method mentioned in the previous paragraph, micropore volumes of EC-xx were always higher than those of C-xx. Methods (a) and (b) served as an internal cross-check of the micropore volumes calculated via $N_2$-sorption. Thus, methods (a) and (b) gave micropore volumes within 12.5% of one another for C-xx, and within 31% for EC-xx. Next, in the case of C-xx, micropore volumes via $CO_2$ adsorption were 34.4% lower than those obtained via $N_2$ sorption. However, in the case of EC-xx, micropore volumes via $CO_2$ adsorption were less than half of those obtained via $N_2$-sorption. Therefore, although it can be claimed that in the case of C-xx the $V_{micropore,N2}$ and $V_{micropore,CO2}$ were within error from one another, in the case of EC-xx it is safe to conclude that $CO_2$ did not fill its entire micropore volume (this may be a valid comparison given that the van der Waals radii of $CO_2$ and $N_2$ are similar: 1.57 Å vs. 1.55 Å, respectively); yet the micropore volume of EC-xx, as reflected by $CO_2$ porosimetry, was still 1.52× higher than that of C-xx (note: all volumetric comparisons in this paragraph concern average values over all xx.) Representative PSD data in the micropore range are shown in FIG. 15B (PSD data for all samples are shown in FIG. 16). The PSDs of both C-xx and EC-xx were qualitatively similar, and the effect of etching, in addition to opening closed pores, was to make micropores somewhat wider, shifting the entire PSDs of EC-xx to slightly larger volumes.

Overall, C-xx and EC-xx were monolithic materials with total specific pore volumes calculated via $V_{Total}=(1/\rho_b)-(1/\rho_s)$ many-fold higher (up to 12×) than the sum of pore volumes below 300 nm ($V_{1.7\text{-}300\_nm}+V_{micropore,N2}$). Below 300 nm, porosities were dominated by pore sizes <1.7 nm: in C-xx $V_{micropore,N2}$ was 60-70% of ($V_{1.7\text{-}3.00\_nm}+V_{micropore,N2}$); in EC-xx that ratio was higher, in the range of 85-90%. In summary, both C-xx and EC-xx were essentially bimodal macroporous/microporous materials, which, together with their monolithicity, are highly desirable properties, as described in embodiments of the invention herein.

Example 9

Comparative gas sorption of $CO_2$, $CH_4$, $N_2$ and $H_2$ by C-xx and EC-xx. It is known that CCS by nanoporous materials involves kinetic and thermodynamic factors related to the pore size, and the surface properties of the adsorber. The micropore size distribution of C-xx and CE-xx (FIG. 15B) is in the order of the kinetic diameter of $CO_2$ (3.3 Å), and that may meet the kinetic aspect of the mechanism for CCS (see below). On the other hand, the presence of pyridinic and pyridonic nitrogen may enhance the thermodynamic interaction of both C-xx and EC-xx with acidic $CO_2$. Upon a close look at the isotherms of FIG. 15A, at 0° C./1 bar C-xx adsorbed 3.3 mmol of $CO_2$ per g of adsorber, while EC-xx adsorbed up to 4.9 mmol (21% w/w) per g of EC-xx (a 48% increase over C-xx). Note that the $CO_2$ uptake by EC-xx is equal or better than what has been reported for many other carbons (Himeno, S.; et al., *J. Chem. Eng. Data* 2005, 50:369-376; Ben, T., et al., *Energy Environ. Sci.* 2012, 5:8370-8376), and is known to compete favorably with several porous carbons specifically doped with N from suitable precursors (3.9-6.2 mmol g$^{-1}$, all at 273-298 K, 1 bar), or even with certain MOFs doped specifically with amines and pyrimidine moieties (e.g., bio-MOF-11, 6 mmol g$^{-1}$ at 273 K) (An, J., et al., *J. Am. Chem. Soc.* 2010, 132:38-39.). The fact that neither C-xx nor EC-xx show saturation up to 1 bar (FIG. 15A), leaves plenty of scope for further investigation at higher pressures.

Using the van der Waals radius of $CO_2$ (2.57 Å) and considering either the average BET surface area (366±46 m$^2$ g$^{-1}$), or the average pore volume of C-xx (0.167 cm$^3$ g$^{-1}$ via low-pressure $N_2$ sorption; Table 4), the theoretical uptake of $CO_2$ should be either at 2.93 mmol g$^{-1}$, or at 3.90 mmol g$^{-1}$, respectively. The experimental $CO_2$ uptake (3.3 mmol of $CO_2$ per gram of C-xx) is closer to the theoretical value calculated via the BET surface area, and in fact not very far off the value calculated from the micropore volume. Things, however, are different for EC-xx: considering the average BET surface area of those materials (1409±355 m$^2$ g$^{-1}$), the theoretical $CO_2$ uptake (for monolayer coverage) should be 11.3 mmol g$^{-1}$; considering the average micropore volume (0.417 cm$^3$ g$^{-1}$ via low-pressure $N_2$ sorption; Table 4) the theoretical uptake of $CO_2$ should be at 9.74 mmol per gram of EC-xx. Both calculated values are significantly higher than the top experimental $CO_2$ uptake of 4.9 mmol of $CO_2$ per gram of EC-xx. Clearly, on one hand EC-xx is more efficient than C-xx in uptaking $CO_2$, however, the increased uptake is not as large as would have been expected by the increase in either surface area or micropore volume. Apart from a slight shift in the average pore sizes (FIG. 15B), the main difference between C-xx and EC-xx is apparently in the balance of N between pyridinic and pyridonic sites (FIG. 12; note that the ratio pyridinic_N:pyridonic_N was 1.71 for C-xx and 0.59 for EC-xx). Thus, it is believed herein that N is not only involved in $CO_2$ capture, but it also does so more effectively if it is located in pyridinic versus pyridonic sites. This conclusion is in line with the higher nucleophilicity of N expected from pyridinic versus pyridonic sites.

Figure 17:
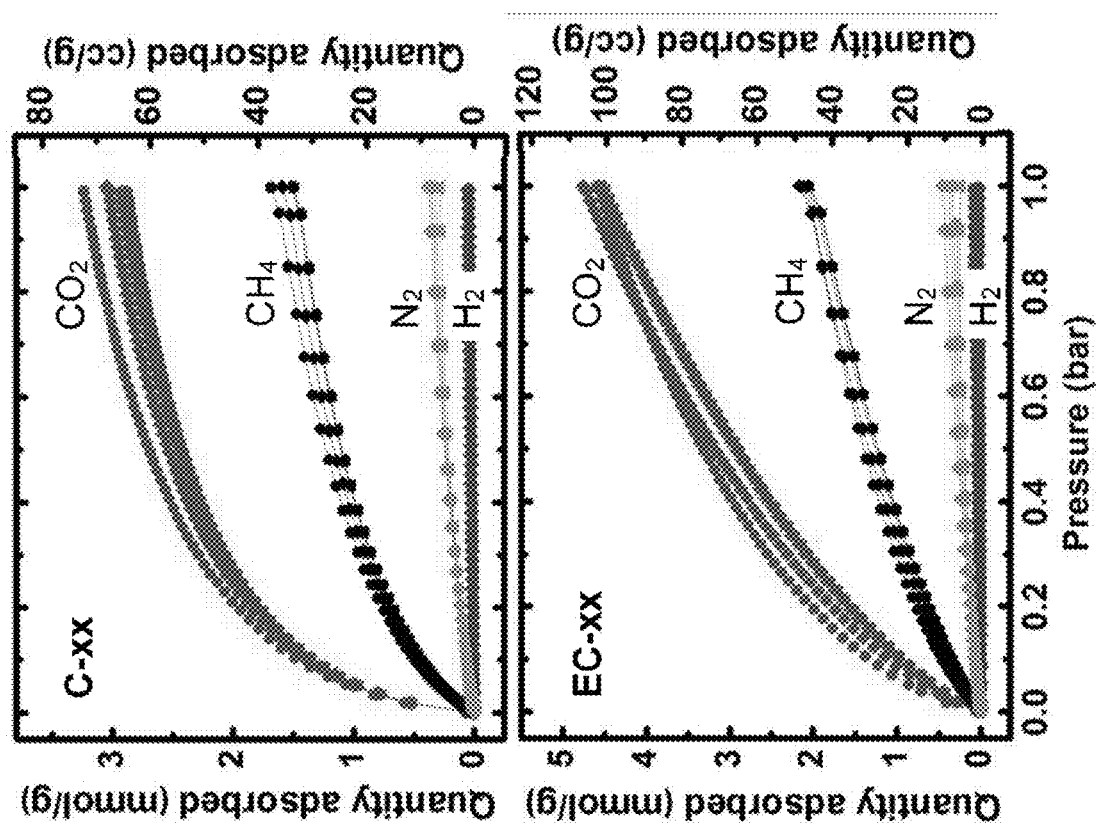
FIG. 17. Adsorption isotherms at 0° C. (273 K) up to 1 bar of the four gasses as shown on C-xx and EC-xx. The plots include samples at all five xx levels considered herein.
Figure 18:
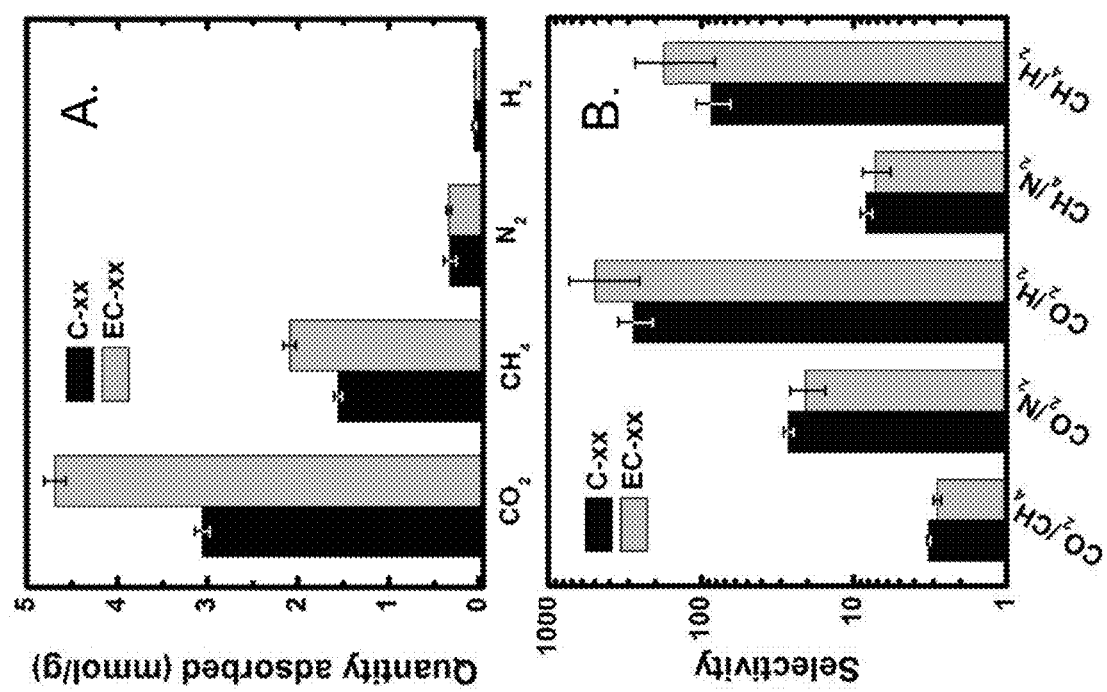
FIG. 18. A. Comparison of the total gas uptake at 0° C./1 bar by C-xx and EC-xx (data from FIG. 17). B. Selectivities calculated from the low-pressure end of the isotherms of FIG. 17 using Henry's law. Data in both parts A and B are averages over all the xx levels of C-xx and EC-xx. (For the actual data, refer to Table 5).

The promising levels of $CO_2$ adsorption by C-xx and EC-xx motivated gas adsorption selectivity studies towards fuels ($CH_4$ and $H_2$, relevant to pre-combustion gas purification) as well as towards $N_2$ (relevant to post-combustion CCS). FIG. 17 compares the adsorption isotherms of the four gasses up to 1 bar at 273 K. In turn, FIG. 10A compares the relative gas uptake by C-xx and by EC-xx at 1 bar, showing that at least for $CO_2$ and $CH_4$, EC-xx was clearly a stronger adsorber than C-xx. (Collective gas sorption data are presented in Table 5). Both C-xx and EC-xx took up significant amounts of methane, up to 2.16 mmol $g^{-1}$ at 1 bar by the latter (3.45% w/w). The uptake of $N_2$, and particularly of $H_2$ were much lower (<0.5 mmol $g^{-1}$) with the uptake of $H_2$ being the lowest (<0.05 mmol $g^{-1}$). There are several factors at play for the differential uptake of gasses by microporous adsorbers, including carbons (Gadipelli, S.; et al., *Prog. Mater. Sci.* 2015, 69:1-60), including the kinetic diameter, the quadrupole moment and the polarizabity of the gasses. The kinetic diameters of $CO_2$, $CH_4$, $N_2$ and $H_2$ (3.30 Å, 3.80 Å, 3.64 Å, and 2.89 Å, respectively) are not likely to account for the differential volumes adsorbed. For example, kinetic diameters are involved in differential adsorption when an adsorber does not uptake a gas (e.g., $N_2$) at cryogenic temperatures (77 K), but it does so in an activated environment (e.g., about ambient temperature). Clearly, this is not the case here as both C-xx and EC-xx uptake $N_2$ at both 77 K and 0° C., thereby restricted access to micropores through narrow pore entrances may be ruled out for $N_2$. Given that all three $CO_2$, $CH_4$ and $N_2$ have about equal kinetic diameters, the latter has to be excluded as a cause of differential adsorption in all four cases considered herein. Next, although on one hand the quadrupole moments of $CO_2$, $N_2$ and $H_2$ (4.30, 1.52 and 0.662 in units of esu $cm^2 \times 10^{-26}$, respectively) do follow the trend of the differential gas uptake noted experimentally at 0° C./1 bar (FIG. 18A), the quadrupole moment of $CH_4$ (zero) cannot explain the high uptake of that gas, leaving that role to its high polarizability. (Relative polarizabilities for $CO_2$, $CH_4$, $N_2$ and $H_2$: 29.11; 25.93; 17.403; and, 8.042, all in units of $cm^3 \times 10^{-25}$). Overall, although the polarizability of $CH_4$ may indeed explain its anomalous high uptake, neither the polarizabilities, nor the quadrupole moments can explain the experimental ratios of, for example, $V_{CO2}/V_{N2}=13.4:1$ and $V_{CO2}/V_{H2}=112:1$ (these data concern EC-xx; see Table 5). That disproportionally high uptake of $CO_2$ must be attributed to some sort of special interaction of $CO_2$ with the cavity. Thus, it is possible that once in the micropores, $CO_2$ reacts with wall-bound pyridinic and (perhaps) pyridonic N towards pyridinic/pyridonic-N+—(C=O)O$^-$. Now, since additional $CO_2$ molecules inside the micropores have already paid an entropic cost in order to enter those pores, reaction of $CO_2$ with wall-bound —(C=O)O$^-$ groups to form pyridinic/pyridonic-N+—(C=O)O—(C=O)O$^-$ is a practically energy-neutral process, and may contribute towards further accumulation of $CO_2$ in the micropores. (The "energy-neutral" argument is based on the bond energy of C=O, which is 173-181 kcal mol$^{-1}$, and the bond energy of C—O, which is exactly half: 85-91 kcal mol$^{-1}$ (March's Advanced Organic Chemistry. Sixth Edition. Smith. M. B.; March, J. Eds, John Wiley & Sons, Inc., Hoboken, N.J. 2007, p 3-31).

TABLE 5

Adsorption capacities and selectivities as shown. Gas sorption data for $CO_2$, $CH_4$, $N_2$ and $H_2$ by C-xx and by EC-xx at 273 K, 1 bar.

| Sample | $N_2$ adsorption @1 bar (273 K) | | $CO_2$ adsorption @1 bar (273 K) | | $H_2$ adsorption @1 bar (273 K) | | $CH_4$ adsorption @1 bar (273 K) | | Selectivity | | | | |
|---|---|---|---|---|---|---|---|---|---|---|---|---|---|
| | mmol/g | % w/w | mmol/g | % w/w | mmol/g | % w/w | mmol/g | % w/w | $CO_2/N_2$ | $CO_2/H_2$ | $CO_2/CH_4$ | $CH_4/N_2$ | $CH_4/H_2$ |
| PA-xx | | | | | | | | | | | | | |
| 5 | — | — | 0.91 | 4.00 | — | — | 0.22 | 0.35 | — | — | 10.0 | — | — |
| 10 | — | — | 0.85 | 3.74 | — | — | 0.17 | 0.27 | — | — | 13.0 | — | — |
| 15 | — | — | 0.86 | 3.78 | — | — | 0.21 | 0.33 | — | — | 9.40 | — | — |
| 20 | — | — | 0.86 | 3.78 | — | — | 0.22 | 0.35 | — | — | 9.60 | — | — |
| 25 | — | — | 0.80 | 3.52 | — | — | 0.19 | 0.30 | — | — | 10.5 | — | — |
| C-xx | | | | | | | | | | | | | |
| 5 | 0.32 | 0.90 | 3.27 | 14.4 | 0.05 | 0.01 | 1.68 | 2.68 | 30.6 | 180 | 3.18 | 9.64 | 56.7 |
| 10 | 0.29 | 0.81 | 2.99 | 13.2 | 0.05 | 0.01 | 1.51 | 2.41 | 26.6 | 380 | 3.27 | 8.14 | 116 |
| 15 | 0.36 | 1.03 | 3.05 | 13.4 | 0.05 | 0.01 | 1.52 | 2.43 | 25.5 | 222 | 3.36 | 7.60 | 66.2 |
| 20 | 0.31 | 0.87 | 2.91 | 12.8 | 0.05 | 0.01 | 1.49 | 2.38 | 24.7 | 301 | 3.22 | 7.67 | 93.6 |
| 25 | 0.35 | 0.98 | 3.07 | 13.5 | 0.04 | 0.00$_9$ | 1.59 | 2.54 | 26.3 | 310 | 3.13 | 8.38 | 99.0 |
| EC-xx | | | | | | | | | | | | | |
| 5 | — | — | 4.66 | 20.5 | 0.08 | 0.01 | 2.12 | 3.39 | 30.9 | 284 | 3.08 | 10.0 | 92.4 |
| 10 | 0.25 | 0.70 | 4.62 | 20.4 | 0.04 | 0.00$_8$ | 2.09 | 3.34 | 20.5 | 336 | 2.74 | 7.51 | 122 |
| 15 | 0.38 | 1.06 | 4.67 | 20.5 | 0.04 | 0.00$_8$ | 2.04 | 3.26 | 17.1 | 342 | 2.94 | 5.81 | 116 |
| 20 | 0.33 | 0.92 | 4.64 | 20.4 | 0.02 | 0.00$_4$ | 2.05 | 3.28 | 16.8 | 928 | 2.60 | 6.47 | 356 |
| 25 | 0.44 | 1.23 | 4.85 | 21.3 | 0.03 | 0.00$_6$ | 2.16 | 3.45 | 17.9 | 584 | 2.84 | 6.32 | 205 |

The relative selectivity of C-xx and EC-xx towards the four gasses herein was quantified thermodynamically using Henry's law (Perry's Chemical Engineer's Handbook, 6th Edition, Green, D. W.; Perry, R. H, Eds, McGraw-Hill, 1984, pp 9-14, ISBN 0-07-049479-7). Selectivity for one gas versus another was defined as the ratio of the Henry's law constants, KH, for the gasses under consideration; in turn, the KH values were obtained from the slopes of the linear parts of the isotherms of FIG. 17 at low pressures (<0.1 bar). (Correlation coefficients, $R^2$>0.975.) The resulting selectivity values are plotted in FIG. 18B (for the primary data see Table 5). The highest selectivity was observed in the $CO_2/H_2$ pair (from 284:1 up to 928:1). The $CH_4/H_2$ pair showed the second highest selectivity (in the range of 57:1 to 360:1). The lowest selectivity was observed in the $CO_2/CH_4$ pair (2.6:1 to 3.4:1). The selectivity in the $CO_2/N_2$ pair (in the range of 17:1 to 31:1) was comparable to what has been reported for several other nanoporous carbons tested under similar conditions of temperature and pressure (Jin, Y., et al., *Energy Environ. Sci.* 2013, 6:2591-2596), yet below other noncarbonaceous microporous $CO_2$ adsorbers. For example, certain organic cages have shown $CO_2/N_2$ adsorption selectivity up to 73:1 (1.0 bar, 293 K), however, the absolute amount of $CO_2$ adsorbed was just 0.20 mmol $g^{-1}$ (Jin, Y., et al., *Angew. Chem. Int. Ed.* 2010, 49: 6348-6351). Reported $CO_2/N_2$ selectivities for amide networks based on rigid tetraphenyladamantane were in the 58-74 range, still the $CO_2$ uptake at 273 K/1 bar was only 1.47 mmol $g^{-1}$ (Zulfiqar, S., et al., *J. Mater. Chem. A.* 2016, 4:8190-8197). Similarly, certain azo-COPs from tetrafunctional monomers have shown remarkable $CO_2/N_2$ selectivities at 273 K, 1 bar (63.7-109.6), but again a relatively low $CO_2$ uptake (2.55 mmol $g^{-1}$) (Patel, H. A., et al., *Chem. Eur. J.* 2014, 20:772-780.). Overall, more often than not, there seems to be a tradeoff in organic $CO_2$ adsorbers between adsorption capacity and selectivity. Incidentally, this appears to be also the case here with the parent PA-xx: PA-xx show a high selectivity for $CO_2$ vs. $CH_4$ (around 10), but low capacities (<1 mmol $g^{-1}$) (data included in Table 5). In that regard, C-xx and EC-xx seem to offer a fair balance between the two desirable properties: selectivity and adsorption capacity. But, there is more to it: in order to place C-xx and EC-xx in a broader perspective, all factors related to practicality need to be considered. The latter is a tradeoff not only of adsorption capacity and selectivity, but also of physicochemical stability, cost and scalability. In terms of cost and scalability, it is difficult to imagine any kind of process scale-up into commodity materials for $CO_2$ adsorption with specialty chemicals. On the contrary, C-xx and EC-xx were designed precisely with those factors in mind. In terms of stability, in addition to being insoluble in all common (and less common) organic solvents, in two separate experiments C-xx and EC-xx were placed for 7 days in 12 M HCl, and again for 7 days in water in an autoclave at 200° C., with no observable shrinkage, mass loss, or change in density and porosity in either experiment.

The following Examples provide additional experimental details of the procedures used in the invention.

Example 10

Materials. All reagents and solvents were used as received, unless noted otherwise. Anhydrous tetrahydrofuran (THF) and 1,2,4,5-benzenetetracarboxylic acid (pyromellitic acid, PMA, 96%) were purchased from Sigma Aldrich Chemical Co. Deuterated DMSO (DMSO-$d_6$) and deuterated chloroform (CDCl$_3$) were obtained from Cambridge Isotope Laboratories. Tris(4-isocyanatophenyl)-methane (TIPM) was obtained from Covestro LLC (formerly Bayer Corporation U.S.A.) as a 27% w/w solution in dry ethyl acetate under the trade name Desmodur RE. Siphon grade $CO_2$, argon (99.99999%), $N_2$ (99.999%), $H_2$ (99.999%), $CO_2$ (99.999%), and $CH_4$ (99.99%) were purchased from Ozark Gas (Rolla, Mo.).

Example 11

Synthesis of polymeric aerogels (PA-xx). In a typical procedure, PMA (1.77 g, 6.96 mmol, re-dried at 120° C. for 24 h) was dissolved in variable amounts of anhydrous THF and the solution was added to 13.6 g of Desmodur RE (containing 3.67 g, 10.0 mmol of TIPM). The resulting solution was stirred at room temperature under $N_2$ for 10 min, and subsequently was poured into molds (Wheaton 4 mL Polypropylene Omni-Vials 1.04 cm in inner diameter, Fisher part No. 225402), which were then sealed and left for gelation. The total weight percent concentration of monomers (PMA+TIPM) in the solution was varied by varying the amount of solvent (THF), and is denoted by extension -xx in the sample names, which are referred to as PA-xx. (PA: Polymeric Aerogels; xx was varied in the range 5≤xx≤25, at 5 levels). All solutions gelled at room temperature. (Attempted gelation of a PA-2.5 solution failed at room temperature, but that solution gelled at 60° C.). All formulations and gelation times are summarized in Table 1. All gels were aged for 12 h at room temperature in their molds, then they were removed from the molds, washed with THF (2×, 8 h each time), and acetone (4×, 8 h each time), using an amount of solvent equal to 4× the volume of the gel for each wash. Finally, wet-gels were dried with liquid $CO_2$ in an autoclave taken out as a supercritical fluid (SCF).

Example 12

Conversion of PA-xx aerogels to carbon aerogels (C-xx). PA-xx aerogel monoliths were transferred into a MTI GSL1600X-80 tube furnace (alumina 99.8% pure, 72/80 mm inner/outer diameters, 457 mm heating zone). The temperature was raised to 800° C. at 5° C. min$^{-1}$ under flowing Ar (150 mL min$^{-1}$) for 5 h. At the end of the heating period the temperature was returned to room temperature at 5° C. min$^{-1}$ under constant flow of Ar.

Example 13

Conversion of C-xx aerogels to etched carbon aerogels (EC-xx). C-xx aerogels were placed in a tube furnace under flowing argon and were heated at 1000° C. The flowing gas was switched to $CO_2$ and the temperature was maintained at that level for 3 h. Typically, that process was carried out in tandem with carbonization. Subsequently, the flowing gas was switched back to Ar and the temperature was returned to room temperature at 5° C. min$^{-1}$ under constant flow of Ar.

Example 14

Methods. Drying of acetone-exchanged wet-gels with supercritical fluid (SCF) $CO_2$ was carried out in an autoclave (SPIDRY Jumbo Supercritical Point Dryer, SPI Supplies, Inc. West Chester, Pa.). Samples were loaded into the autoclave and acetone was added till all samples were submerged. The pressure vessel was closed and liquid $CO_2$ was allowed in at room temperature until it displaced all acetone, which was then drained out. Liquid $CO_2$ was allowed in the vessel several more times until acetone was extracted out of the pores of the samples completely. The criterion for the latter was that $CO_2$ released from the vessel formed powder of dry ice. Finally, the temperature of the autoclave was raised to 40° C. and SCF $CO_2$ was vented off as a gas.

Example 15

Physical Characterization: Bulk densities ($\rho_b$) were calculated from the weight and the physical dimensions of the samples. Skeletal densities ($\rho_s$) were measured with helium pycnometry using a Micromeritics AccuPyc II 1340 instrument.

Example 16

Chemical Characterization: CHN elemental analysis was performed by Intertek Pharmaceutical Services (Whitehouse, N.J.). Infrared (IR) spectra were taken in KBr, on a Nicolet-FTIR Model 750 spectrometer. Liquid $^{13}$C-NMR spectra of monomers were obtained with a 400 MHz Varian Unity Inova NMR instrument (100 MHz carbon frequency). Solid-state CPMAS $^{13}$C-NMR spectra were obtained with samples ground into fine powders on a Bruker Avance III 400 MHz spectrometer with a carbon frequency of 100 MHz, using a 7 mm Bruker MAS probe at a magic angle spinning rate of 5 kHz, with broadband proton suppression, and the CP TOSS pulse sequence. The Total Suppression of Spinning Sidebands (TOSS) pulse sequence was applied by using a series of four properly timed 180° pulses on the carbon channel at different points of a cycle before the acquisition of the FID, after an initial excitation with a 90° pulse on the proton channel. The 90° excitation pulse on the proton and the 180° excitation pulse on carbon were set to 4.2 μs and 10 μs, respectively. A contact time of 2 ms was used for cross polarization. Solid-state $^{13}$C NMR spectra were referenced externally to glycine (carbonyl carbon at 176.03 ppm). Chemical shifts are reported versus TMS (0 ppm). Solid-state CPMAS $^{15}$N-NMR spectra were also obtained on the same Bruker Avance III 400 MHz Spectrometer with a nitrogen frequency of 40.557 MHz, using a 7 mm Bruker MAS probe with broadband proton suppression and magic angle spinning rate of 5 kHz. For cross polarization, a 90° proton excitation pulse was set to 4.2 μs with 2 ms contact time. Chemical shifts are reported versus liquid ammonia (0 ppm) and were externally referenced to glycine (amine nitrogen at 33.40 ppm). In all solid-state NMR experiments the relaxation delay was set at 5 s.

XPS data were obtained with a Kratos Axis 165 Photoelectron Spectroscopy System. Flat samples were placed on conductive carbon tape that was then adhered to stainless steel sample holders. Samples were introduced into the analysis chamber one at a time and the chamber was evacuated at $10^{-8}$ Torr or lower. No ion sputtering was performed on any of the samples. An Al monochromatic source at 150 watts was used for excitation. A charge neutralizer was used to reduce the effects of differential or sample charging. The analysis area was 700×300 microns. Elemental quantification calculations were based on broad survey results from single sweeps at higher sensitivity (Pass Energy=80), and were carried out with the Kratos Axis Vision processing software and its appropriate relative sensitivity factors for the particular XPS system. High resolution elemental scans where carried out at a lower sensitivity (Pass Energy=20), using multiple sweeps to improve the signal-to-noise ratios.

Example 17

Structural Characterization: Scanning electron microscopy (SEM) was conducted with Au-coated samples on a Hitachi Model S-4700 field-emission microscope. The fundamental building blocks of all aerogels were probed with small angle X-ray scattering (SAXS), using ~2 mm thick disks cut either with a knife (in case of PA-xx, very important), or with a diamond saw (in case of C-xx). SAXS was conducted with a PANalytical X'Pert Pro multipurpose diffractometer (MPD) configured for SAXS, using Cu Kα radiation (wavelength=1.54 Å), a $\frac{1}{32}$° SAXS slit, a $\frac{1}{16}$° antiscatter slit on the incident beam side, and a 0.1 mm antiscatter slit together with a Ni 0.125 mm automatic beam attenuator on the diffracted beam side. Samples were placed in circular holders between thin Mylar sheets, and scattering intensities were measured by running 2θ scans from −0.1° to 5° with a point detector in the transmission geometry. All scattering data were reported in arbitrary units as a function of Q, the momentum transferred during a scattering event. Data analysis was conducted using the Beaucage Unified Model applied with the Irena SAS tool for modeling and analysis of small angle scattering within the Igor Pro application (a commercial scientific graphing, image processing, and data analysis software from Wave Metrics, Portland, Oreg.).

Example 18

Thermal Characterization: Thermogravimetric analysis (TGA) was conducted under $N_2$ with a TA Instruments Model TGA Q50 analyzer, using a heating rate of 5° C. $min^{-1}$.

Example 19

Porosimetry and gas sorption selectivity study: All samples were degassed at 80° C. for 24 h prior to each gas sorption study. BET surface areas and pore size distributions for pore sizes in the 1.7-300 nm range were determined with $N_2$-sorption porosimetry at 77 K using a Micromeritics ASAP 2020 surface area and porosity analyzer. Micropore analysis was conducted either with $N_2$-sorption, at 77 K using a low-pressure transducer (0.1 Torr) on the Micromeritics ASAP 2020 surface area and porosity analyzer, or with $CO_2$-sorption up to 760 torr (0.03 relative pressure) at 273 K (ice-water bath) using a Micromeritics Tristar II 3020 version 3.02. The same instrument was used for a relative adsorption study for $N_2$, $H_2$, $CH_4$ and $CO_2$ at 273 K. Adsorption isotherms were obtained at 0° C. up to 1 bar, and the gas sorption selectivities were calculated with Henry's law: C=KH×p, where, C: concentration (mmol $g^{-1}$) in phase I; p: pressure (bar) in phase II; $k_H$: Henry's law constant (mmol $g^{-1}$ $bar^{-1}$), from the ratios of the low-pressure slopes (<0.1 bar) of the corresponding isotherms (FIG. 17).

As can be easily understood from the foregoing, the basic concepts of the present invention may be embodied in a variety of ways. The invention involves numerous and varied embodiments of treatments of the conditions described herein, and the like.

As such, the particular embodiments or elements of the invention disclosed by the description or shown in the figures or tables accompanying this application are intended to be exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates.

In addition, as to each term used, it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes, for example, the numeric values 1, 1.5, 2, 2.75, 3, 3.80, 4, 5, and so forth. It will be further understood that the endpoints of each of the ranges are significant both in relation to the other endpoint and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

It is to be understood that, as used herein, the grammatical conjunction "and/or" refers throughout to either or both of the stated possibilities.

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Moreover, for the purposes of the present invention, the term "a" or "an" entity refers to one or more of that entity unless otherwise limited. As such, the terms "a" or "an", "one or more" and "at least one" can be used interchangeably herein.

As used herein, the term "composition" generally refers to any product comprising the specified ingredients in the specified amounts, as well as any product which results, directly or indirectly, from combinations of the specified ingredients in the specified amounts. It is to be understood that the compositions described herein may be prepared from isolated compounds described herein or from salts, solutions, hydrates, solvates, and other forms of the compounds described herein. It is also to be understood that the compositions may be prepared from various amorphous, non-amorphous, partially crystalline, crystalline, and/or other morphological forms of the compounds described herein. It is also to be understood that the compositions may be prepared from various hydrates and/or solvates of the compounds described herein. Accordingly, such compositions that recite compounds described herein are to be understood to include each of, or any combination of, the various morphological forms and/or solvate or hydrate forms of the compounds described herein.

For the purpose of this invention, it is to be understood that terms such as "gel and/or aerogel composition", "gel and/or aerogel material", "gel and/or aerogel", and related terms used herein, may be used interchangeably, unless clearly indicated by the context.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed, or deemed to be admitted as prior art with respect to the invention.

The claims set forth in this specification are hereby incorporated by reference as part of this description of the invention, and the applicants expressly reserve the right to use all of or a portion of such incorporated content of such claims as additional description to support any of or all of the claims or any element or component thereof, and the applicants further expressly reserve the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification are further intended to describe the metes and bounds of a limited number of the preferred embodiments of the invention and are not to be construed as the broadest embodiment of the invention or a complete listing of embodiments of the invention that may be claimed. The applicants do not waive any right to develop further claims based upon the description set forth above as a part of any continuation, division, or continuation-in-part, or similar application.

While the disclosure has been illustrated and described in detail in the figures and foregoing description, the same is to be considered as illustrative and not restrictive in character, it being understood that only selected embodiments have been shown and described and that all changes, modifications and equivalents that come within the spirit of the disclosures described heretofore and/or defined by the following claims are desired to be protected. It will be apparent to one of ordinary skill in the art that various changes and modifications can be made to the claimed invention without departing from the spirit and scope thereof. Thus, for example, those skilled in the art will recognize, or be able to ascertain, using no more than routine experimentation, numerous equivalents to the specific substances and procedures described herein. In addition, all publications cited herein are indicative of the level of skill in the art and are hereby incorporated by reference in their entirety as if each had been individually incorporated by reference and fully set forth.

What is claimed is:

1. A porous co-polymeric composition comprising gels and/or aerogels:
said composition obtained by mixing together one or more polyisocyanate compounds and one or more polycarboxylic acid compounds at room temperature in a solvent;
wherein the polyisocyanate compound includes at least 2 isocyanate functional groups, and wherein the polycarboxylic acid compound includes at least 3 carboxylic acid functional groups at least 2 of which are positioned relative to each other in such a manner so as to be able to form an intramolecular anhydride;
said composition including at least an amide linkage, an imide linkage and a urea linkage present in any random order.

2. The composition of claim 1 wherein the one or more polyisocyanate compound is a compound of the formula (II) and the one or more polycarboxylic acid compound is a compound of the formula (III):

| G1-(NCO)q | G2-(COOH)r |
|---|---|
| (II) | (III) | wherein:
G1 is a moiety selected from C1-C10 straight chain alkyl or branched alkyl or cycloalkyl, alkylaryl, aryl, heteroalkyl, heterocyclylalkyl, or heteroaryl, each of which is optionally substituted;
G2 is a moiety selected from alkyl, cycloalkyl, heteroalkyl, heterocylcoalkyl, alkylaryl, cycloalkylaryl, alkylheteroaryl, cycloalkylheteroaryl, an arene ring system, or a heteroarene ring system, each of which is optionally substituted;
q=2-6; and,
r=3-8.

3. The composition of claim 1, wherein the one or more polyisocyanate compound and the one or more polycarboxylic acid compound are mixed together in such amounts so that the ratio of isocyanate functional groups to carboxylic acid functional groups is about 1:1.

4. The composition of claim 1, wherein the one or more polyisocyanate compound is selected from the following compounds:

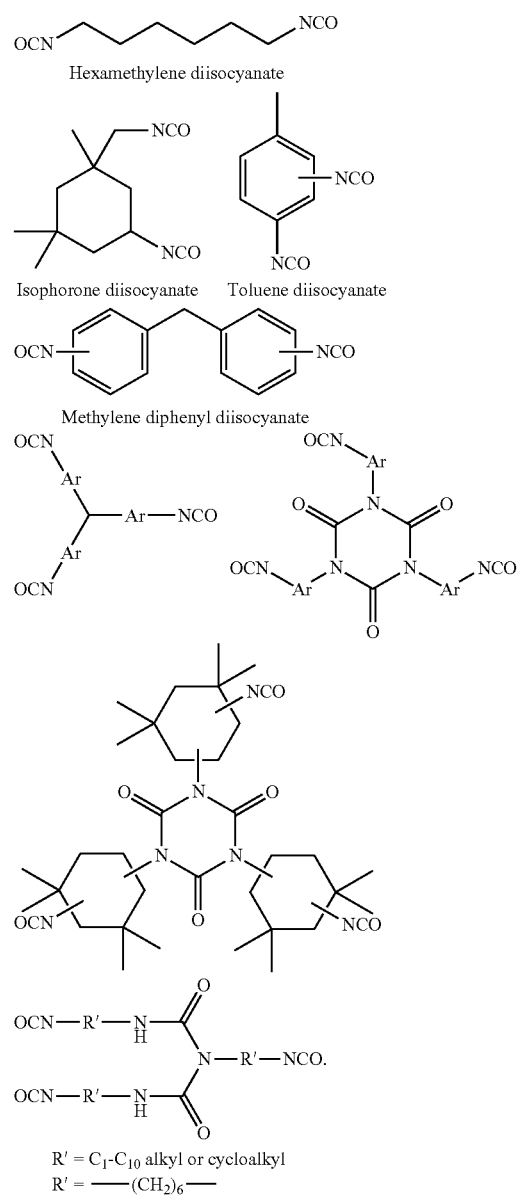

5. The composition of claim 1, wherein the one or more polycarboxylic acid compound is selected from the following compounds, or is derivable from its respective anhydride shown:

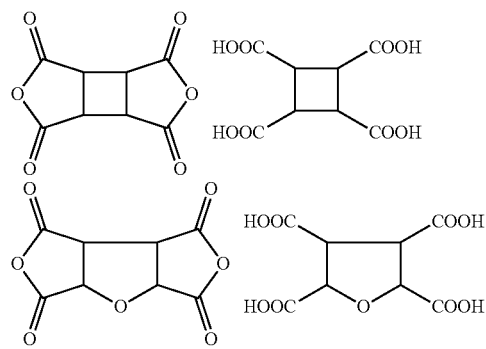

-continued

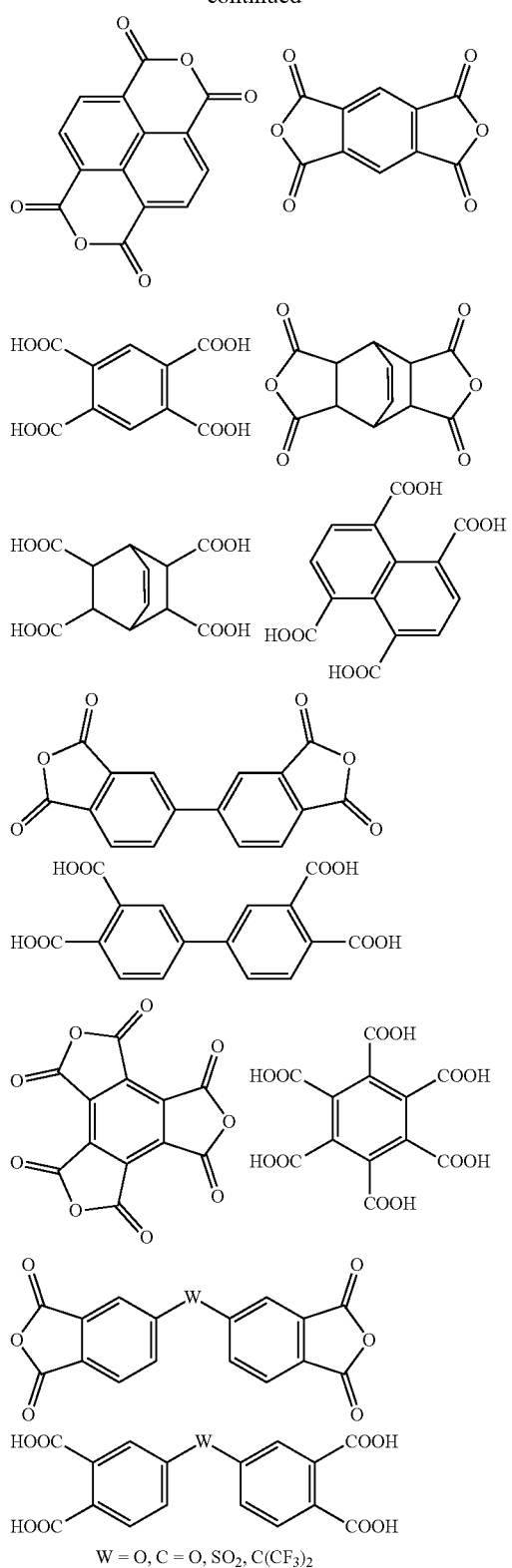

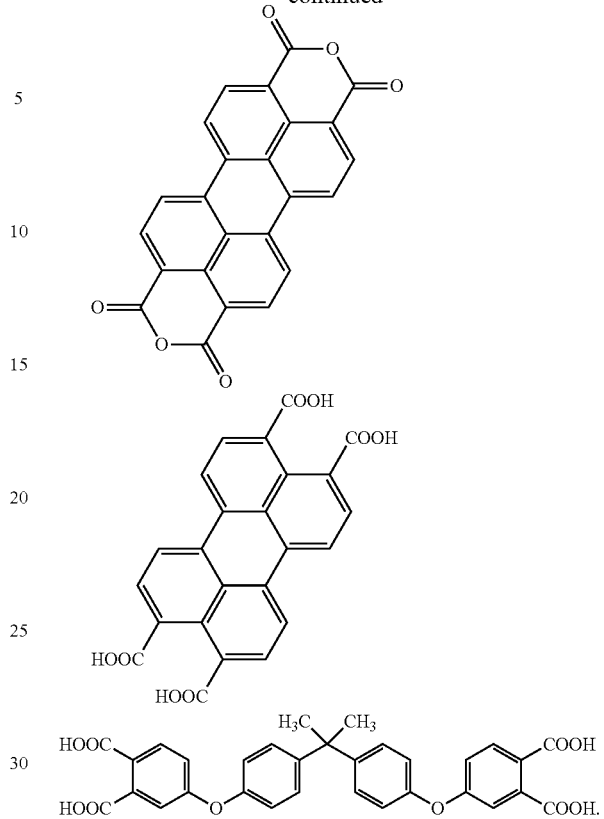

6. The composition of claim 1, wherein the solvent is a single solvent or a mixture of solvents, including ether-type solvents, ester-type solvents, amide-type solvents, ketone-type solvents, nitrile-type solvents, or mixtures of any of the foregoing solvents.

7. The composition of claim 2, wherein the one or more polyisocyanate compound is a compound of the formula (IV) and the one or more polycarboxylic acid compound is a compound of the formula (V):

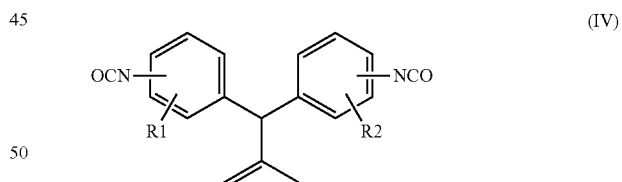

(IV)

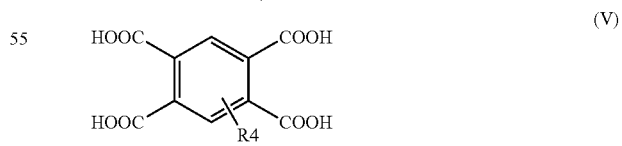

(V)

wherein the isocyanate groups of compound (IV) are independently attached to their respective aryl rings at the 2, 3, or 4-positions of the aryl rings;

wherein R1, R2, R3, and R4 are independently one or more substituents selected from H, alkyl, cycloalkyl, alkoxy, alkylthio, aryl, aryloxy, arylthio, each of which is optionally substituted, and halogen, nitro, or cyano.

8. The composition of claim 7, wherein the composition has the formula (VI):

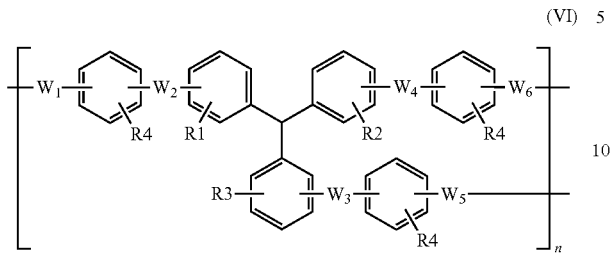

(VI)

wherein W1, W2, W3, W4, W5, and W6 represent linking moieties selected from an amide group, a urea group, an imide group, a carbamic-anhydride group, and/or any combinations thereof; and, n is an integer ranging from 2 to about 500.

9. The composition of claim 8, wherein R1, R2, R3, and R4 are H; and, wherein the isocyanate groups of the polyisocyanate compound (IV) are attached to their respective aryl rings at the 4-positions of the aryl rings.

10. The composition of claim 1, further including a carbamic-anhydride linkage.

\* \* \* \* \*